(12) United States Patent
Nagai

(10) Patent No.: US 7,804,907 B2
(45) Date of Patent: Sep. 28, 2010

(54) RADIO-FREQUENCY RECEIVER DEVICE

(75) Inventor: Takuya Nagai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 933 days.

(21) Appl. No.: 11/551,923

(22) Filed: Oct. 23, 2006

(65) Prior Publication Data
US 2007/0049200 A1    Mar. 1, 2007

Related U.S. Application Data

(63) Continuation-in-part of application No. PCT/JP2005/005507, filed on Mar. 25, 2005.

(30) Foreign Application Priority Data

Apr. 23, 2004    (JP)    ............... 2004-128705

(51) Int. Cl.
*H04L 27/28*    (2006.01)
(52) U.S. Cl. ................................. 375/260
(58) Field of Classification Search ............... 375/259, 375/260, 316, 346
See application file for complete search history.

(56) References Cited

U.S. PATENT DOCUMENTS 6,115,426 A    9/2000    Fujimoto et al.
6,289,004 B1*    9/2001    Mesecher et al. ........... 370/286
2004/0185815 A1*    9/2004    Fukuda et al. .............. 455/296
2004/0246889 A1    12/2004    Ogawa et al.

FOREIGN PATENT DOCUMENTS

| JP | 1997247005 A | 9/1997 |
|----|--------------|--------|
| JP | 1998210099 A | 8/1998 |
| JP | 200215288 A | 1/2002 |
| JP | 2003124857 A | 4/2003 |
| JP | 2003273831 A | 9/2003 |
| KR | 20010010445 | * 2/2001 |

OTHER PUBLICATIONS

International Search Report (International Patent Application No. PCT/JP2005/005507—counterpart to above-captioned patent application), mailed Jul. 12, 2005.

* cited by examiner

*Primary Examiner*—Kevin M Burd
(74) *Attorney, Agent, or Firm*—Baker Botts L.L.P.

(57) ABSTRACT

A radio-frequency receiver device including an adaptive processing portion for controlling weights to be given to respective received signals respectively received by a plurality of antenna elements, wherein the adaptive processing portion includes a plurality of frequency analyzing portions operable to convert the received signals received by the antenna elements, into frequency signals, and is operable to control the weights on the basis of the frequency signals obtained by conversion from the received signals by the frequency analyzing portions.

17 Claims, 12 Drawing Sheets

RADIO-FREQUENCY RECEIVER DEVICE

The present application is a Continuation-in-Part of International Application No. PCT/JP2005/005507 filed Mar. 25, 2005, which claims the benefits of Japanese Patent Application No. 2004-128705 filed Apr. 23, 2004.

BACKGROUND OF THE INVENTION

1. Field of the Invention

The present invention relates to improvements of a radio-frequency receiver device including an adaptive processing portion operable to control weights to be given to respective received signals respectively received by a plurality of antenna elements.

2. Description of the Related Art

In various fields of communication, there are available adaptive processing techniques for controlling the weights to be given to respective received signals respectively received by a plurality of antenna elements. In the field of a mobile communication system such as a PHS (Personal Handyphone System), for example, there have been proposed techniques for improving the sensitivity of reception of the received signals in a radio-frequency receiver device including an adaptive processing portion operable to control the weights to be respectively given to the received signals respectively received by a plurality of antenna elements. US 2004/0246889 A1 corresponding to JP-2003-124857 A discloses an example of such a radio-frequency receiver device. The radio-frequency receiver device disclosed in this publication is arranged to converge the weights such that signals generated by the adaptive processing portion become as close as possible to reference signals.

However, the adaptive processing according to the conventional technique described above requires not only the use of training signals for comparison with the reference signals, and transmission of the training signals in addition to desired data to be transmitted, but also a considerably time until the weights have been converged. Thus, there has been a need of developing a radio-frequency receiver device including an adaptive processing portion which is capable of converging the weights as quickly as possible.

SUMMARY OF THE INVENTION

The present invention was made in view of the background art described above. It is accordingly a first object of this invention to provide a radio-frequency receiver device capable of converging the weights to be given to respective received signals, as quickly as possible. A second object of this invention is to provide a radio-frequency tag communication device which includes such a radio-frequency receiver device.

The first object indicated above may be achieved according to a first aspect of this invention, which provides a radio-frequency receiver device including an adaptive processing portion for controlling weights to be given to respective received signals respectively received by a plurality of antenna elements, wherein the adaptive processing portion includes a plurality of frequency analyzing portions operable to convert the received signals received by the plurality of antenna elements, into frequency signals, and is operable to control the weights to be given to the respective received signals, on the basis of the frequency signals obtained by conversion of the received signals by the frequency analyzing portions.

In the radio-frequency receiver device of the present invention constructed as described above, the adaptive processing portion includes the frequency analyzing portions for converting the received signals received by the plurality of receiver antennas, into the frequency signals, and is arranged to control the weights on the basis of the frequency signals obtained by conversion from the received signals by the frequency analyzing portions. The adaptive processing portions use the frequency signals obtained by the frequency analyzing portions, as reference signals in the adaptive processing, and therefore does not require training signals. Thus, the radio-frequency receiver device is provided with the adaptive processing portion which permits rapid convergence of the weights without requiring conventionally required data in the form of the training signals.

According to a first preferred form of the radio-frequency received device of the present invention, the frequency analyzing portions are operable to effect Fourier transformation of the received signals received by the plurality of antenna elements, into the frequency signals. In this form of the invention, the received signals received by the plurality of antenna elements can be effectively converted into the frequency signals, by the Fourier transformation.

According to a second preferred form of the radio-frequency received device of the invention, wherein the adaptive processing portion further includes: a plurality of characteristic extracting portions operable to extract characteristic signals indicative of characteristics of the received signals received by the plurality of antenna elements, on the basis of the frequency signals obtained by conversion from the received signals by the frequency analyzing portions; a plurality of weight calculating portions operable to calculate the weights to be respectively given to the received signals, on the basis of the characteristic signals extracted by the characteristic extracting portions; a plurality of weight multiplying portions operable to multiply the received signals respectively received by the plurality of antenna elements, by the weights calculated by the weight calculating portions; a signal combining portion operable to combine together the received signals multiplied by the weights by the weight multiplying portions, for thereby obtaining a composite signal; and an inverse frequency analyzing portion operable to convert the composite signal obtained by the signal combining portion, into a timewise signal. In this form of the invention, the adaptive processing operation of the adaptive processing portion is effected on the basis of the frequency signals, and the subsequent processing operation is effected on the basis of the timewise signal, so that the time required to convert the frequency signals into the timewise signal can be reduced.

According to a third preferred form of the radio-frequency receiver device of the invention, the adaptive processing portion further includes: a plurality of characteristic extracting portions operable to extract characteristic signals indicative of characteristics of the received signals received by the plurality of antenna elements, on the basis of the frequency signals obtained by conversion from the received signals by the frequency analyzing portions; a plurality of weight calculating portions operable to calculate the weights to be respectively given to the received signals, on the basis of the characteristic signals extracted by the characteristic extracting portions; a plurality of inverse frequency analyzing portions operable to convert the weight calculated by the weight calculating portions, into timewise signals; a plurality of weight multiplying portions operable to multiply the received signals respectively received by the plurality of antenna elements, by the timewise signals obtained by conversion from the weights by the inverse frequency analyzing portions; and a signal combining portion operable to combine together the received signals multiplied by the timewise signals by the weight multiplying portions. In this form of the invention, the characteristic extracting and weight calculating operations of the received signals are effected on the basis of the frequency signals, and the subsequent processing operations are effected on the basis of the timewise signals, so that the timewise signals in the form of discrete or sampled signals can be utilized as the signals for conversion into the frequency signals for the weight calculating operation.

According to a fourth preferred form of the radio-frequency receiver device of this invention, the adaptive processing portion further includes: a plurality of characteristic extracting portions operable to extract characteristic signals indicative of characteristics of the received signals received by the plurality of antenna elements, on the basis of the frequency signals obtained by conversion from the received signals by the frequency analyzing portions; a plurality of inverse frequency analyzing portions operable to convert the characteristic signals extracted by the characteristic extracting portions, into timewise signals; a plurality of weight calculating portions operable to calculate the weights to be respectively given to the received signals, on the basis of the timewise signals obtained by conversion from the characteristic signals by the inverse frequency analyzing portions; a plurality of weight multiplying portions operable to multiply the received signals respectively received by the plurality of antenna elements, by the weights calculated by the weight calculating portions; and a signal combining portion operable to combine together the received signals multiplied by the weights calculated by the weight multiplying portions. In this form of the invention, the characteristic extracting operation of the received signals is effected on the basis of the frequency signals, and the subsequent processing operations are effected on the basis of the timewise signals, so that the timewise signals in the form of discrete or sampled signals can be utilized as the signals for conversion into the frequency signals for the characteristic extracting operation.

In a first advantageous arrangement of the second, third and fourth preferred forms of this invention, the plurality of characteristic extracting portions extract, as the characteristic signals, a main carrier wave and side band signals from the frequency signals obtained by the frequency analyzing portions, and the plurality of weight calculating portions calculate the weights to be respectively given to the received signals received by the plurality of antenna elements, on the basis of a correlation between the carrier and the side band signals which have been extracted by the characteristic extracting portions. The use of the frequency signals for extracting the characteristic signals permits effective separation of each received signal into an information signal, noises and the main carrier wave, and makes it possible to increase the intensity of the information signal.

In the above-descried first advantageous arrangement of the second, third and fourth preferred forms of this invention, the plurality of weight calculating portions are preferably arranged to calculate the weights to be respectively given to the received signals received by the plurality of antenna elements, such that a ratio of the main carrier wave and the side band signals extracted by the characteristic extracting portions becomes as close as possible to a predetermined value. The use of the ratio of the main carrier wave and the side band signals for calculating the weights eliminates the need of using the conventional required training signals.

In the above-described first advantageous arrangement of the second, third and fourth preferred forms of this invention, the plurality of characteristic extracting portions are preferably arranged to extract a pair of side band signals in the form of an upper band signal and a lower band signal which have a same difference of frequency with respect to a frequency of the main carrier wave. In this arrangement, the amplification of the side band signal component in DSB (double side band) is effected by superimposition of the received signal on both of the upper and lower side bands in a symmetric pattern with respect to the axis of the main carrier wave. The side band signals can be selected by utilizing this characteristic of the received signal.

In the above-descried first advantageous arrangement of the second, third and fourth preferred forms of this invention, the plurality of characteristic extracting portions are preferably arranged to extract a plurality of pair of side band signals each pair in the form of an upper band signal and a power band signal which have a same difference of frequency with respect to a frequency of the main carrier wave, and said plurality of weight calculating portions calculate different weight vectors for the respective of pairs of side band signals extracted by the characteristic extracting portions. In this arrangement, the different weight vectors can be calculated for the respective pairs of side band signals, so that the received signals can be intensified.

In the above-described first advantageous arrangement of the above-described second, third and fourth preferred forms of this invention, the adaptive processing portion further preferably includes a memory for storing the received signals received by the plurality of antenna elements. In this case, the plurality of weight calculating portions read out from said memory the received signals to calculate the weights. This arrangement permits the calculation of the weights with a simple circuit.

In a second advantageous arrangement of the above-described second, third and fourth preferred forms of this invention, the plurality of weight calculating portions stop calculation of the weights for a predetermined length of time after a composite signal obtained by the signal combining portion has been converged into a predetermined value. In this arrangement, the radio-frequency receiver device eliminates an unnecessary weight calculating operation, so that the required electric power consumption can be reduced. In addition, the required volume of arithmetic operation for the weight calculation can be reduced, making it possible to accordingly reduce the time required for processing the received signals.

According to a fifth preferred form of the radio-frequency receiver device of this invention, the adaptive processing portion further includes: a cancel-signal generating portion operable to generate cancel signals having a same frequency as that of a main carrier wave of a transmitted signal transmitted from a transmitter portion of a communication device which includes the radio-frequency receiver device; a cancel-signal control portion operable to control a phase and an amplitude of the cancel signals generated by the cancel-signal generating portion; and a plurality of cancel-signal adding portion operable to add, to the respective received signals received by the plurality of antenna elements, the cancel signals the phase and amplitude of which have been controlled by the cancel-signal control portion, and wherein the cancel signal control portion is operable to control the phase and amplitude of the received signals, so as to minimize a signal power of the main carrier wave of the received signals to which the cancel signals have been added by the cancel-signal adding portions. In this form of the invention, a leakage signal which is a part of the transmitted signal and which is included in the received signals can be effectively eliminated from the received signals.

The second object indicated above may be achieved according to a second aspect of the present invention, which provides a radio-frequency tag communication device comprising a transmitter portion operable to transmit a predetermined transmitted signal toward a plurality of radio-frequency tags, a plurality of receiver antennas, and a radio-frequency receiver device operable to receive through the plurality of receiver antennas received signals transmitted the said plurality of radio-frequency tags in response to the transmitted signals, the radio-frequency receiver device including an adaptive processing portion constructed according to the first aspect of this invention described above. The present radio-frequency tag communication device including the adaptive processing portion capable of converging the weights as quickly as possible has substantially same advantages as described above with respect to the radio-frequency receiver device.

BRIEF DESCRIPTION OF THE DRAWING

The above and other objects, features and industrial significance of this invention will be better understood by reading the following detailed description of the preferred embodiments of the invention, when considered in connection with the accompanying drawings in which.

DETAILED DESCRIPTION OF THE PREFERRED EMBODIMENTS

The preferred embodiments of this invention will be described in detail by reference to the accompanying drawings.

First Embodiment

Figure 1:
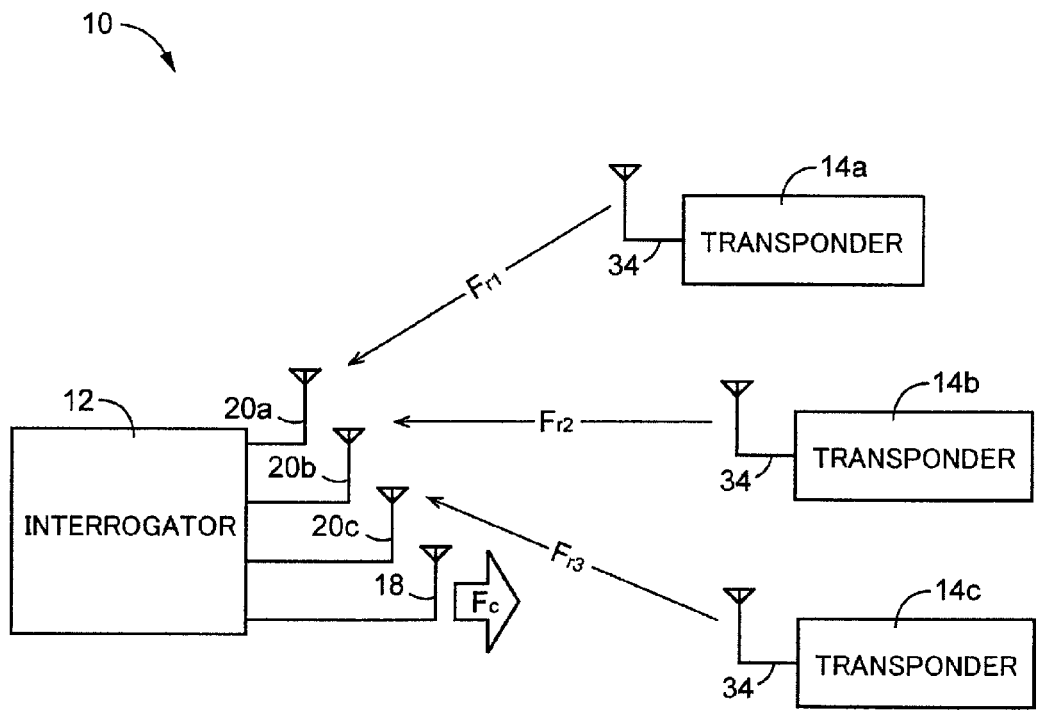
FIG. 1 is a view showing an arrangement of a communication system including a radio-frequency communication device to which the present invention is applicable, and a plurality of radio-frequency identification tags.

Referring first to FIG. 1, there is shown an arrangement of a communication system 10 including a radio-frequency tag communication device 12 which incorporates a radio-frequency receiver device constructed according to a first embodiment of the present invention. The communication system 10 further includes a plurality of, more specifically, three radio-frequency identification tags 14a, 14b, 14c (hereinafter collectively referred to as radio-frequency identification tags 14, unless otherwise specified). The communication system 10 is a so-called RFID system (Radio-Frequency Identification system) consisting of an interrogator in the form of the radio-frequency tag communication device 12 and a plurality of transponders in the form of the radio-frequency identification tags 14. Described in detail, the radio-frequency tag communication device 12 is arranged to transmit an interrogating wave $F_c$, (transmitted signal), and the radio-frequency identification tags 14a, 14b, 14c are arranged to receive the interrogating signal $F_c$, and effect secondary modulation of the received interrogating signal $F_c$, according to sub-carrier waves $f_{s1}$, $f_{s2}$, $f_{s3}$, which have been subjected to primary modulation according to predetermined information signals. As a result of the secondary modulation, reply waves (reply signals) $F_{r1}$, $F_{r2}$, $F_{r3}$ (hereinafter collectively referred to as reply signals $F_r$, unless otherwise specified) are generated by the respective radio-frequency identification tags 14a, 14b, 14c, and transmitted toward the radio-frequency tag communication device 12.

Figure 2:
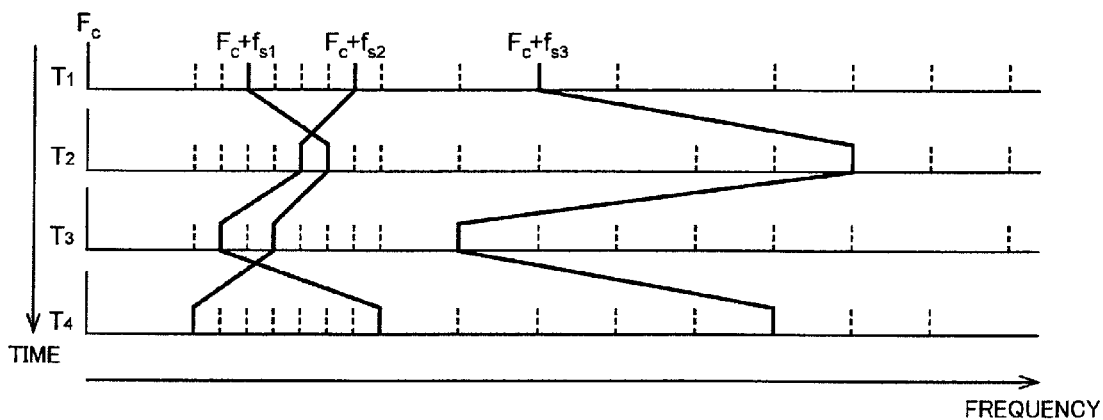
FIG. 2 is a view indicating a relationship between an interrogating wave transmitted from the radio-frequency communication device, and reply waves transmitted from the radio-frequency identification tags, in the communication system of FIG. 1.

Referring next to FIG. 2, there is indicated a relationship between the interrogating wave $F_c$, transmitted from the radio-frequency tag communication device 12, and the reply waves $F_r$, transmitted from the radio-frequency identification tags 14, in the communication system 10 of FIG. 1. Each of the sub-carrier waves $f_s$ used in the radio-frequency identification tags 14 consists of a pair of side band signals in the form of an upper band signal and a lower band signal which have the same difference of frequency with respect to the frequency of a main carrier wave. Preferably, the sub-carrier waves $f_{s1}$, $f_{s2}$, $f_{s3}$, of the radio-frequency identification tags 14a, 14b, 14c are subjected to frequency hopping in respective different manners. That is, the radio-frequency identification tags 14a, 14b, 14c are arranged to generate respective pairs of side band signals $F_c \pm f_{s1}$, $F_c \pm f_{s2}$ and $F_c \pm f_{s3}$. The order in which the three frequency values of the side band signals $F_c \pm f_{s1}$, $F_c \pm f_{s2}$ and $F_c \pm f_{s3}$ increase is changed at random at different timings $T_1$, $T_2$, $T_3$ and $T_4$. At the timing $T_1$, for example, the frequency value of the upper band signal $F_c + f_{s1}$ generated by the tag 14a is the lowest, and the frequency value of the upper band signal $F_{c+}f_{s3}$ generated by the tag 14c is the highest, while the frequency value of the upper band signal $F_{c+}f_{s2}$ generated by the tag 14b is intermediate between the two frequency values $F_{c+}f_{s1}$ and $F_{c}\pm f_{s3}$, as indicated in FIG. 2. The sub-carrier waves for the reply waves $F_{r1}$, $F_{r2}$, $F_{r3}$ to be generated by the radio-frequency identification tags 14a, 14b, 14c are subjected to frequency hopping on the basis of quasi-random codes, so that there is an extremely low probability of continuously mutual collision of the sub-carrier waves, whereby signals relating to the modulation of the reply waves $F_{r1}$, $F_{r2}$, $F_{r3}$ can be extracted from the replay waves $F_{r1}$, $F_{r2}$, $F_{r3}$ independently of each other. While FIG. 2 indicates the upper band signals only, there exists a similar relationship among the frequencies of the lower band signals, which is symmetrical with the relationship of the upper band signals, with respect to an axis of the frequency of the interrogating wave $F_c$.

Figure 3:
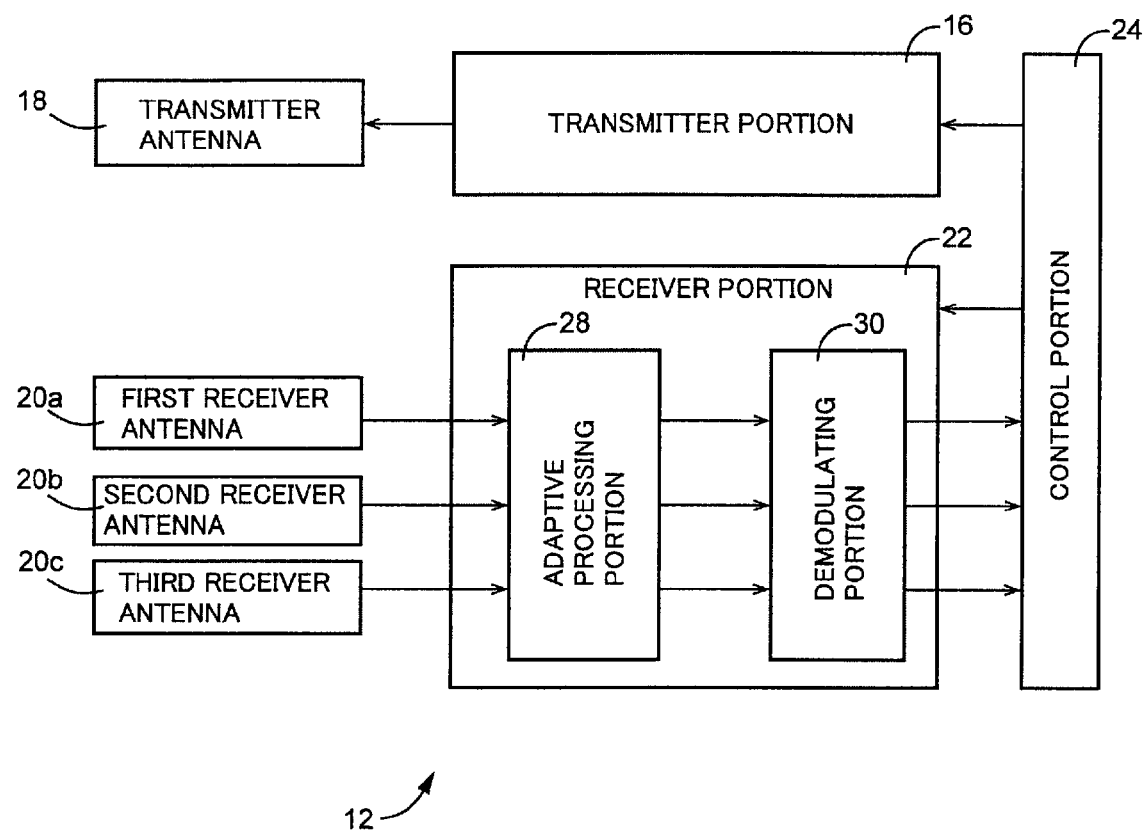
FIG. 3 is a block diagram showing an electrical arrangement of the radio-frequency tag communication device of the communication system of FIG. 1.

Reference is now made to the block diagram of FIG. 3, showing an electrical arrangement of the radio-frequency tag communication device 12. As shown in FIG. 3, the radio-frequency tag communication device 12 includes: a transmitter portion 16 operable to generate and transmit the above-indicated interrogating wave $F_c$; a transmitter antenna 18 arranged to transmit the interrogating wave $F_c$ generated by the transmitter portion 16, toward the radio-frequency identification tags 14; a plurality of receiver antenna elements in the form of a first receiver antenna 20a, a second receiver antenna 20b and a third receiver antenna 20c (hereinafter collectively referred to as receiver antennas 20, unless otherwise specified), which are arranged to receive the reply waves Fr transmitted from the radio-frequency identification tags 14 in response to the interrogating wave $F_c$; a receiver portion 22 operable to process received signals received by the receiver antennas 20; and a control portion 24 operable to control operations of the radio-frequency tag communication device 12. The receiver portion 22 functions as a radio-frequency receiver device according to the present invention, and includes an adaptive processing portion 28 operable to implement an AAA (Adaptive Array Antenna) processing to control the weights to be given to the respective received signals received by the respective receiver antennas 20a, 20b, 20c, and a demodulating portion 30 operable to demodulate the received signals subjected to the adaptive array antenna processing (hereinafter referred to as "adaptive processing").

The control portion 24 is a so-called microcomputer which incorporates a CPU (central processing unit), a ROM (read-only memory) and a RAM (random-access memory) and which is operable to implement signal processing operations according to control programs stored in the ROM, while utilizing a temporary data storage function of the RAM. Described more specifically, the control portion 24 controls an operation of the transmitter portion 16 to transmit the interrogating wave Fc toward the radio-frequency identification tags 14, and operations of the adaptive processing portion 28 and demodulating portion 30 of the receiver portion 22 to process the received signals in the form of the reply waves $F_r$.

Figure 4:
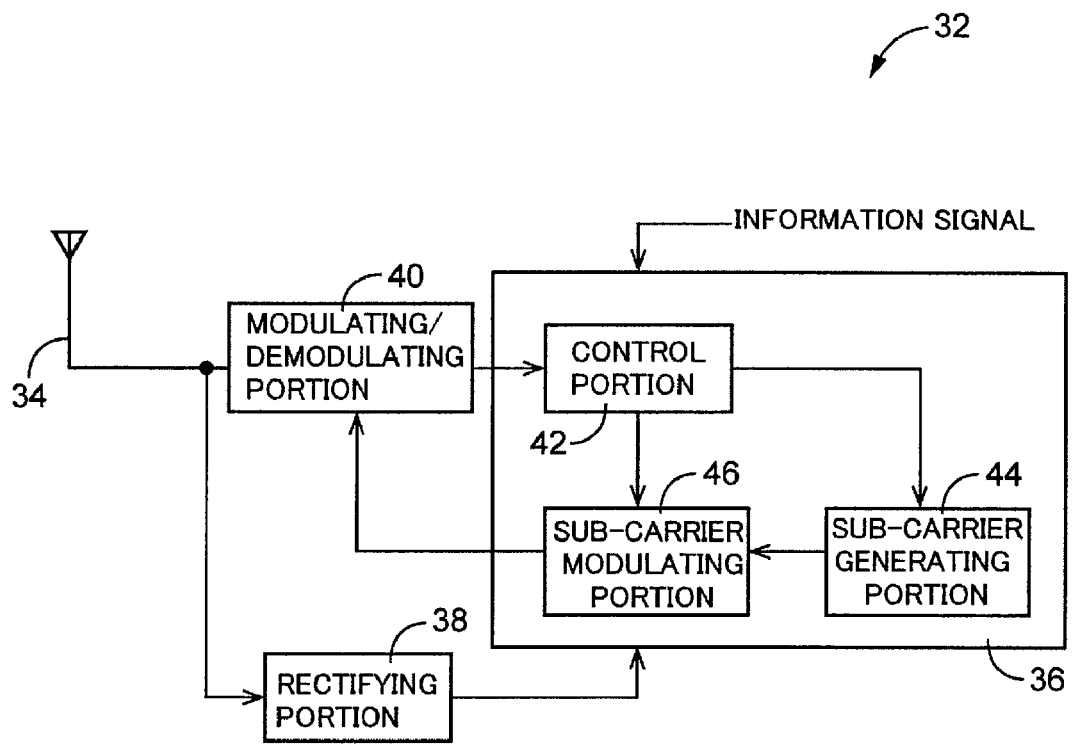
FIG. 4 is a block diagram illustrating a radio-frequency tag circuit included in each of the radio-frequency identification tags of the communication system of FIG. 1.

Referring further to the block diagram of FIG. 4, there is shown a radio-frequency tag circuit 32 included in each of the radio-frequency identification tags 14. As shown in FIG. 4, the radio-frequency identification tag 14 consists of: an antenna 34 arranged to receive the interrogating wave $F_c$ transmitted from the radio-frequency tag communication device 12 described above, and transmit the reply wave $F_r$ toward the radio-frequency tag communication device 12; a digital circuit portion 36 operable to implement a digital signal processing operation; a rectifying portion 38 operable to rectify a portion of the interrogating wave $F_c$ received by the antenna 34, and supply a thus obtained electric energy to the digital circuit portion 36; and a modulating/demodulating portion 40 connected to the antenna 34 and operable to modulate and demodulate the interrogating wave $F_c$, as described below. The digital circuit portion 36 includes functional portions in the form of a control portion 42 operable to control an operation of the radio-frequency tag circuit 32; a sub-carrier generating portion 46 operable to generate a sub-carrier wave; and a sub-carrier modulating portion 46 operable to effect modulation (primary modulation) such as phase modulation (PSK) of the sub-carrier wave generated by the sub-carrier generating portion 44, on the basis of an information signal received through the control portion 42. In the digital circuit portion 36, the sub-carrier wave modulated by the sub-carrier modulating portion 46 is received by the modulating/demodulating portion 40, which implements modulation (secondary modulation) of the interrogating wave $F_c$, (transmitted from the radio-frequency tag communication device 12), according to the received sub-carrier wave. The interrogating wave $F_c$, thus modulated by the modulating/demodulating portion 40 is transmitted as the reply wave $F_r$ from the antenna 34 toward the radio-frequency tag communication device 12.

Figure 5:
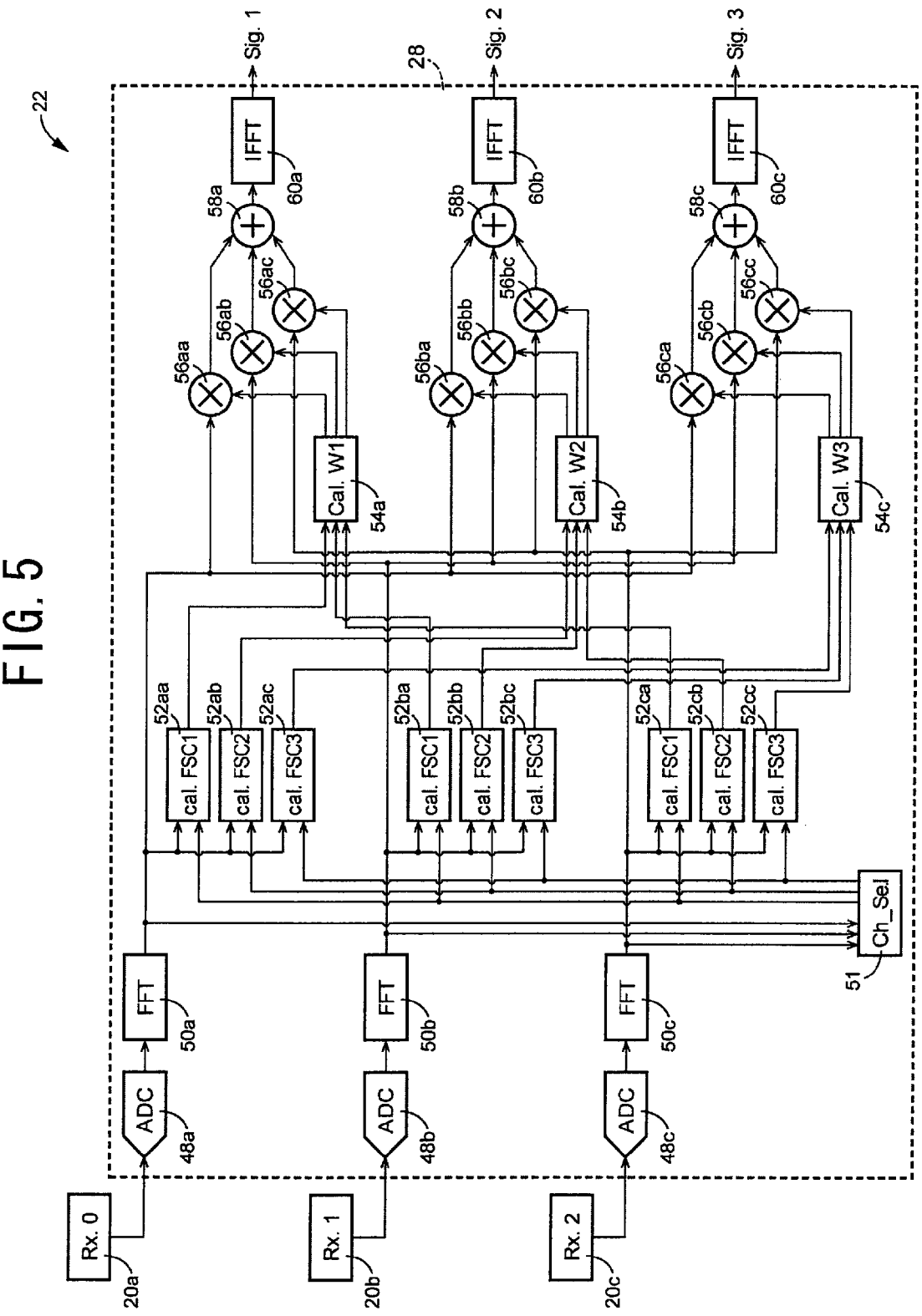
FIG. 5 is a view showing in detail an electrical arrangement of a radio-frequency receiver device in the form of a receiver portion incorporated in the radio-frequency tag communication device of FIG. 3, which receiver device is constructed according to a first embodiment of this invention.

The electrical arrangement of the adaptive processing portion 28 of the radio-frequency tag communication device 12 will be described in detail by reference to FIG. 5. This adaptive processing portion 28 of the receiver portion 22 shown in FIG. 5, which is constructed according to a first embodiment of this invention, includes: a first received-signal A/D converting portion 48a operable to receive the received signal received by the first receiver antenna 20a and convert this received signal into a digital signal, a second received-signal A/D converting portion 48b operable to receive the received signal received by the second receiver antenna 20b and convert this received signal into a digital signal, and a third received-signal A/D converting portion 48c operable to receive the received signal received by the receiver antenna 20c and convert this received signal into a digital signal (the received-signal A/D converting portions 48a, 48b, 40c being hereinafter collectively referred to as received-signal A/D converting portions 48, unless otherwise specified); a first, a second and a third frequency analyzing portion 50a, 50b, 50c (hereinafter collectively referred to as frequency analyzing portions 50) operable to convert the digital signals received from the respective received-signal A/D converting portions 48, in the form of timewise signals (the levels of which vary with time) into frequency signals (the levels of which are represented by the frequency); a communication-channel setting portion 51 operable to set a plurality of communication channels, on the basis of the frequency signals received from the frequency analyzing portions 50; a first, a second, a third, a fourth, a fifth, a sixth, a seventh, an eighth and a ninth characteristic extracting portion 52aa, 52ab, 52ac, 52ba, 52bb, 52bc, 52ca, 52cb, 52cc (hereinafter collectively referred to as characteristic extracting portions 52, unless otherwise specified) operable to extract signals indicative of characteristics of the received signals received by the plurality of receiver antennas 20, on the basis of the frequency signals received from the frequency analyzing portions 50; a first weight calculating portion 54a, a second weight calculating portion 54b and a third weight calculating portion 54c (hereinafter collectively referred to as weight calculating portions 54, unless otherwise specified) which are operable to calculate the weights to be given to the received signals received by the respective receiver antennas 20, on the basis of the characteristic signals extracted by the characteristic extracting portions 52; a first, a second, a third, a fourth, a fifth, a sixth, a seventh, an eighth and a ninth weight multiplying portion 56aa, 56ab, 56ac, 56ba, 56bb, 56bc, 56ca, 56cb and 56cc (hereinafter collectively referred to as weight multiplying portions 56, unless otherwise specified) which are operable to multiply the received signals received by the respective receiver antennas 20, by the weights calculated by the weight calculating portions 54; a first signal combining portion 58a, a second signal combining portion 58b and a third signal combining portion 58c (hereinafter collectively referred to as signal combining portions 58, unless otherwise specified) each of which is operable to combine together the three multiplied received signals received from the corresponding three weight multiplying portions 56; and a first, a second and a third inverse frequency analyzing portion 60a, 60b, 60c (hereinafter collectively referred to as inverse frequency analyzing portions 60, unless otherwise specified) operable to convert the combined signals received from the respective signal combining portions 58, into timewise signals.

Referring to the flow chart of FIG. 6, there will be described a control routine which is repeatedly executed with a predetermined cycle time, by the receiver portion 22 to process the received signals. It is noted that this control routine will be described regarding a triple back-scatter communication in which the radio-frequency tag communication device 12 communicates with the three radio-frequency identification tags 14a, 14b, 14c.

Figure 6:
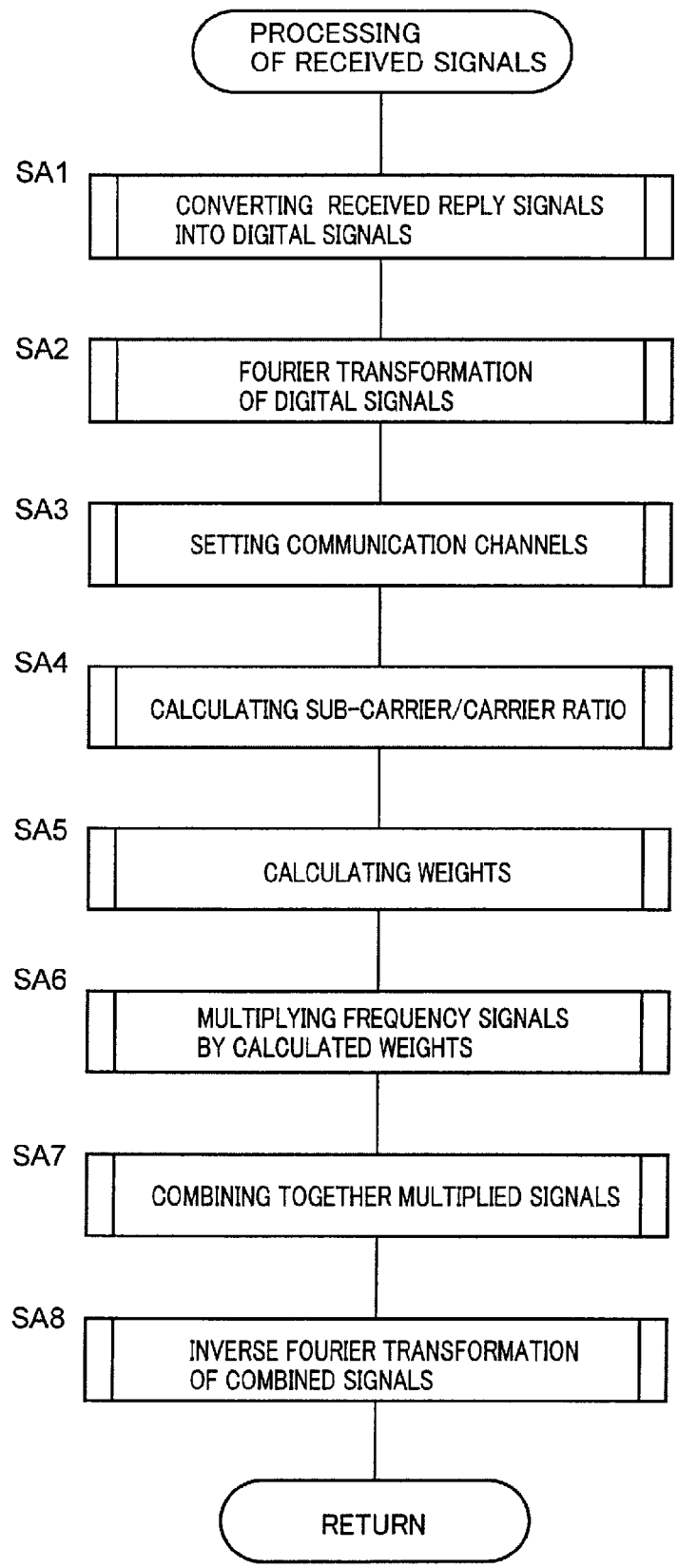
FIG. 6 is a flow chart illustrating an operation of the receiver portion of FIG. 5 to process received signals.

The control routine of FIG. 6 is initiated with step SA1 corresponding to the received-signal A/D converting portions 48, to convert the received signals received by the first, second and third receiver antennas 20a, 20b, 20c, into digital signals. The control flow then goes to step SA2 corresponding to the frequency analyzing portions 50, to implement Fourier transformation of the timewise signals in the form of the received signals converted into the digital signals in step SA1, into the frequency signals. For example, an FFT operation (fast Fourier Transformation or Analysis) of the timewise signals is implemented such that the frequency interval of the frequency signals is equal to a predetermined channel interval, more specifically, such that the entire frequency band of 8,388,608 Hz is divided into equal parts of 4,096 Hz, for instance. This FFT operation by each frequency analyzing portion 50 is represented by an equation (1) given below, wherein "$x_k$" and "$X_k$" respectively represent the input and output signals of the frequency analyzing portion 50. In the equation (1), "N" represents the number of points for each of the receiver antennas 20 used for the FFT operation. For example, the number of points "N" is equal to about 2,048. The received signal converted by each of the first, second and third frequency analyzing portions 50a, 50b, 50c is applied to the communication channel setting portion 51. The received signal received by the first receiver antenna 20a and converted by the first frequency analyzing portion 50a into the frequency signal is applied to the first, second and third characteristic extracting portions 52aa, 52ab, 52ac, and to the first, fourth and seventh weight multiplying portions 56aa, 56ba, 56ca. The received signal received by the second receiver antenna 20b and converted by the second frequency analyzing portion 50b into the frequency signal is applied to the fourth, fifth and sixth characteristic extracting portions 52ba, 52bb, 52bc, and to the second, fifth and eighth weight multiplying portions 56ab, 56bb, 56cb. The received signal received by the third receiver antenna 20c and converted by the third frequency analyzing portion 50c into the frequency signal is applied to the seventh, eighth and ninth characteristic extracting portions 52ca, 52cb, 52cc, and to the third, sixth and ninth weight multiplying portions 56ac, 56bc, 56cc.

$$X_k(n) = \sum_{m=1}^{N} x_k(m) e^{-j2\pi m(n-1)/N} \quad (1)$$

Then, the control flow goes to step SA3 corresponding to the communication channel setting portion 51, to set a plurality of communication channels on the basis of the frequency signals obtained by the FFT operation in step SA2. Each of the three receiver antennas 20a, 20b, 20c receives the reply signals from the three radio-frequency identification tags 14a, 14b, 14c, and the received signal received by each receiver antenna 20 and corresponding to the reply signal from each of the three radio-frequency identification tags 14a, 14b, 14c consists of a pair of upper and lower band signals, so that each receiver antenna 20a, 20b, 20c receives a total of six signals having respective values. Preferably, the three signals of the six signals, which have the first, second and third highest values, are selected as three communication channels for each receiver antenna 20a, 20b, 20c, which respectively correspond to the three radio-frequency identification tags 14a, 14c, 14c. Where the frequency band of the sub-carrier wave $f_s$, used by the radio-frequency identification tag 14 ranges from 65,536 Hz to 92,512 Hz, for example, the values corresponding to the output n=496-466 (upper side band) of the frequency analyzing portion 50 and the values corresponding to the output n=529-560 fall within a band of the communication channel. After the communication channels have been set by the communication channel setting portion 51, the value corresponding to the first channel is applied to the first, fourth and seventh characteristic extracting portions 52aa, 52ba, 52ca, and the value corresponding to the second channel is applied to the second, fifth and eighth characteristic extracting portions 52ab, 52bb, 52cb, while the value corresponding to the third channel is applied to the third, sixth and ninth characteristic extracting portions 52ac, 52bc, 52cc.

The control flow then goes to step SA4 corresponding to the characteristic extracting portions 52, to extract a signal indicative of the characteristic of the received signal, for each of the three communication channels set in step SA3, on the basis of the frequency signal obtained in step SA2. Preferably, a pair of side band signals in the form of an upper band signal and a lower band signal which have the same difference of frequency with respect to the frequency of the main carrier wave of the interrogating wave $F_c$ are extracted for each of the communication channels, and a sub-carrier/carrier ratio $f_{sc}$(k, nch) is then calculated. As is apparent from the equation (1) described above, the frequency signal obtained by the frequency analyzing portion 50 by conversion from the received signal has a phase difference by an amount of $e^{-j2\pi nm/N}$ (wherein "n" represents the number of the channels, while "m" represents the time), so that it is necessary to effect compensation of the frequency signal for each communication channel. Further, since the upper and lower band signals have opposite phases, the lower band signal is multiplied by $e^{j\pi}$. Namely, the input signal k at the time "m" and the signal $f_{ch}$(k, nch) of the channel nch are represented by an equation (2) given below. In this equation (2), "np" represents the arrangement number of the main carrier wave. A carrier $f_{car}$(k) is represented by an equation (3) given below. The sub-carrier/carrier ratio $f_{sc}$(k, nch) is represented by an equation (4) given below, which includes the signal $f_{ch}$(k, nch) of the channel nch and the carrier $f_{car}$(k). In the receiver portion 22, the first, fourth and seventh characteristic extracting portions 52aa, 52ba, 52ca calculate the sub-carrier/carrier ratio $f_{sc}$(k, 1ch) corresponding to the first channel, and the calculated ratio $f_{sc}$(k, 1ch) is applied to the first weight calculating portion 54a. Further, the second, fifth and eighth characteristic extracting portions 52ab, 52bb, 52cb calculate the sub-carrier/carrier ratio $f_{sc}$(k, 2ch) corresponding to the second channel, and the calculated ratio $f_{sc}$(k, 2ch) is applied to the second weight calculating portion 54b, while the third, sixth and ninth characteristic extracting portions 52ac, 52bc, 52cc calculate the sub-carrier/carrier ratio $f_{sc}$(k, 3ch) corresponding to the third channel, and the calculated ratio $f_{sc}$(k, 3ch) is applied to the third weight calculating portion 54c, $$f_{ch}(k, nch) = X_k(np - nch) \times e^{j2\pi m(np-nch-1)/N} \times e^{j\pi} + X_k(np + nch) \times e^{j2\pi m(np+nch-1)/N} \quad (2)$$

$$f_{car}(k) = X_k(np) \times e^{j2\pi m(np-1)/N} \quad (3)$$

$$f_{sc}(k, nch) = \frac{f_{ch}(k, nch)}{f_{car}(k)} \quad (4)$$

Then the control flow goes to step SA5 corresponding to the weight calculating portions 54, to calculate a weight vector for each communication channel, on the basis of the sub-carrier/carrier ratio $f_{sc}$(k, nch) calculated in step SA4. Preferably, the weight vector to be given to the received signal for each communication channel is calculated such that the sub-carrier/carrier ratio $f_{sc}$(k, nch) calculated by the corresponding characteristic extracting portion 52 is as close as possible to a predetermined value. A composite signal output y(nch) is represented by an equation (5) given below, which includes a weight $w_k0$(nch) at the time "m–1" and the sub-carrier/carrier ratio $f_{sc}$(k, nch). In the equation (5), "*" represents a complex conjugate. The weight vector is determined such that the composite signal output y(nch) is equal to a reference signal r0(nch). That is, a weight $w_k0$*(nch) is calculated such that an error signal r0(nch) between the composite signal output y(nch) and the reference signal r0(nch), which error signal is represented by an equation (6) given below is converged into zero. For example, a weight $w_k1$(nch) at the time "m" is calculated from the weight $w_k0$(nch) at the time "m–1", according to equations (7) through (10) given below. This calculation is repeated to calculate the weight vector that causes the composite signal output y(nch) to become as close as possible to the reference signal r0(nch). It is noted that "$R_{xxi}$" in the equation (10) represents an inverse matrix of a correlation matrix indicating correlation of array signals, and "α" is a weighting constant which is larger than 0 and equal to or smaller than 1. In the receiver portion 22, the first weight calculating portion 54a calculates the weight vector corresponding to the first channel, and the calculated weight vector is applied to the first, second and third weight multiplying portions 56aa, 56ab, 56ac. Similarly, the second weight calculating portion 54b calculates the weight vector corresponding to the second channel, and the calculated weight vector is applied to the fourth, fifth and sixth weight multiplying portions 56ba, 56bb, 56bc, while the third weight calculating portion 54c calculates the weight vector corresponding to the third channel, and the calculated weight vector is applied to the seventh, eighth and ninth weight multiplying portions 56ca, 56cb, 56cc.

$$y(nch) = \sum_{k=1}^{3} f_{sc}(k, nch) \times w_k 0 * (nch) \quad (5)$$

$$er(nch) = r0(nch) - y(nch) \quad (6)$$

$$= r0(nch) - \sum_{k=1}^{3} f_{sc}(k, nch) \times w_k 0 * (nch)$$

$$w_k 1(nch) = w_k 0(nch) + \gamma \times rtmp(k) \times er*(nch) \quad (7)$$

$$rtmp(k) = \sum_{k=1}^{3} R_{xxi}(m)(nch, ka, k) \times f_{sc}*(k, nch) \quad (8)$$

$$\gamma = \left\{ \alpha + \sum_{k=1}^{3} rtmp(k) \times f_{sc}*(k, nch) \right\}^{-1} \quad (9)$$

$$R_{xxi}(m)(nch, ka, k) = \quad (10)$$

$$\frac{R_{xxi}(m-1)(nch, ka, k)}{\alpha} - rtmp(k) \times rtmp*(ka) \times \frac{\gamma}{\alpha}$$

The control flow then goes to step SA6 corresponding to the weight multiplying portions 56, to multiply the frequency signals obtained in step SA2 by conversion from the received signals received by the respective first, second and third receiver antennas 20a, 20b, 20c, by the weight vectors corresponding to the respective communication channels. Since the weights calculated by the weight calculating portions 54 have been compensated for the phase difference, according to the equation (2), it is necessary to add the phase difference to the weights, according to the frequency. Namely, a signal X'$_{nch}$(n) which is an intensified signal of the communication channel nch at the time "m" is represented by an equation (11) given below. In the receiver portion 22, the frequency signals received from the first, second and third frequency analyzing portions 50a, 50b, 50c are multiplied by the weight vectors corresponding to the first channel, by the respective first, second and third weight multiplying portions 56aa, 56ab and 56ac, and the multiplied frequency signals are applied to the first signal combining portion 58a. Similarly, the frequency signals received from the first, second and third frequency analyzing portions 50a, 50b, 50c are multiplied by the weight vectors corresponding to the second channel, by the respective fourth, fifth and sixth weight multiplying portions 56ba, 56bb and 56bc, and the multiplied frequency signals are applied to the second signal combining portion 58b, while the frequency signals received from the first, second and third frequency analyzing portions 50a, 50b, 50c are multiplied by the weight vectors corresponding to the third channel, by the respective seventh, eighth and ninth weight multiplying portions 56ca, 56cb and 56 cc, and the multiplied frequency signals are applied to the third signal combining portion 58c.

$$X'_{nch}(n) = \sum_{k=1}^{3} X_k(n) w_k 1 * (nch) \times e^{j2\pi m(n-1)/N} \quad (11)$$

The control flow then goes to step SA7 corresponding to the signal combining 58, to combine together the frequency signals multiplied by the weight vectors corresponding to the first, second and third receiver antennas 20a, 20b, 20c, for each communication channel. In the receiver portion 22, the frequency signals multiplied by the weight vectors corresponding to the first channel are combined together by the first signal combining portion 58a, and applied to the first inverse frequency analyzing portion 60a. Similarly, the frequency signals multiplied by the weight vectors corresponding to the second channel are combined together by the second signal combining portion 58b, and applied to the second inverse frequency analyzing portion 60b, while the frequency signals multiplied by the weight vectors corresponding to the third channel are combined together by the third signal combining portion 58c, and applied to the third inverse frequency analyzing portion 60c.

then, the control flow goes to step SA8 corresponding to the inverse frequency analyzing portions 60, to implement inverse Fourier Transformation of the frequency signals multiplied in step SA7, for each communication channel, to obtain the timewise signals. Thus, one cycle of execution of the control routine of FIG. 6 is terminated. The control routine described above permits adequate reading of information received from the radio-frequency identification tags 14a, 14b, 14c, according to the frequency hopping of the sub-carrier wave in the tags 14a, 14b, 14c.

As described above, the adaptive processing portion 28 according to the present embodiment of the invention includes the frequency analyzing portions 50 (step SA2) for converting the received signals received by the plurality of receiver antennas 20, into the frequency signals, and is arranged to control the weights to be given to the respective received signals, on the basis of the frequency signals obtained by conversion from the respective received signals by the frequency analyzing portions 50. The adaptive processing portions 50 use the frequency signals obtained by the frequency analyzing portions 50, as reference signals in the adaptive processing, and therefore does not require training signals. Thus, the radio-frequency receiver device in the form of the receiver portion 22 is provided with the adaptive processing portion 28 which permits rapid convergence of the weights, without requiring conventionally required data in the form of the training signals.

The frequency analyzing portions 50 are provided to effect Fourier transformation of the received signals received by the receiver antennas 20, to effectively convert the received signals into the frequency signals.

It is also noted that the adaptive processing portion 28 includes; the characteristic extracting portions 52 (step SA4) operable to extract the characteristic signals indicative of the characteristics of the received signals received by the plurality of receiver antennas 20, on the basis of the frequency signals obtained by conversion by the frequency analyzing portions 50; the weight calculating portions 54 (step SA5) operable to calculate the weights to be respectively given to the respective received signals received by the plurality of receiver antennas 20, on the characteristic signals extracted by the characteristic extracting portions 52; the weight multiplying portions 56 (step SA6) operable to multiply the received signals received by the plurality of antennas 20, by the weights calculated by the weight calculating portions 54; the signal combining portions 58 (step SA7) operable to combine together the received signals multiplied by the weights by the weight calculating portions 56; and the inverse frequency analyzing portions 60 (step SA8) operable to convert the combined signals obtained by the signal combining portions 58, into the timewise signals. Thus, the adaptive processing operation of the adaptive processing portion 28 is effected on the basis of the frequency signals, and the subsequent processing operation is effected on the basis of the timewise signals, so that the time required to convert the frequency signals into the timewise signals can be reduced.

It is further noted that the characteristic extracting portions 52 are arranged to extract, as the characteristic signals, the main carrier wave and the side band signals from the frequency signals obtained by conversion by the frequency analyzing portions 50, and the weight calculating portions 54 are arranged to calculate the weights to be respectively given to the received signals received by the plurality of receiver antennas 20, on the basis of the correlation between the main carrier wave and side band signals which have been extracted by the characteristic extracting portions 52. The use of the frequency signals for extracting the characteristic signals permits effective separation of each received signal into an information signal, noises and the main carrier wave, and makes it possible to increase the intensity of the information signal.

It is also noted that the weight calculating portions 54 are arranged to calculate the weights to be respectively given to the received signals received by the plurality of receiver antennas 20, such that the ratio of the main carrier wave and side band signals extracted by the characteristic extracting portions 52 becomes as close as possible to the predetermined value. The use of the ratio of the main carrier wave and side band signals for calculating the weights eliminates the need of using the conventionally required training signals.

It is further noted that the characteristic extracting portions 52 are arranged to extract a pair of side band signals in the form of an upper band signal and a lower band signal which have the same difference of frequency with respect to the frequency of the main carrier wave. The amplification of the side band signal component in DSB (double side band) is effected by superimposition of the received signal on both of the upper and lower side bands in a symmetric pattern with respect to the axis of the main carrier wave. The side band signals can be selected by utilizing this characteristic of the received signal.

It is also noted that the characteristic extracting portions 52 are arranged to extract a plurality of pairs of side band signals each pair in the form of an upper band signal and a lower band signal which have the same difference of frequency with respect to the frequency of the main carrier wave, and that the weight calculating portions 54 are arranged to calculate different weight vectors for the respective pairs of side band signals extracted by the characteristic extracting portions 52. Accordingly, the different weight vectors can be calculated for the respective pairs of side band signals, so that the received signals can be intensified.

It is further noted that the receiver portion 22 is incorporated in the radio-frequency tag communication device 12 which is arranged for communication with the radio-frequency identification tags 14, by transmitting the interrogating signal from the transmitter antenna 18 toward the radio-frequency identification tags 14, and receiving through the receiver antennas 20 the reply signals transmitted from the radio-frequency identification tags 14 in response to the interrogating signal. In other words, the radio-frequency tag communication device 12 is provided with the adaptive processing portion 28 capable of converging the weights as quickly as possible.

Other embodiments of this invention will be described in detail by reference to FIGS. 7-13. In the description of the following embodiments, the same reference signs as used for the first embodiment will be used to identify the corresponding elements, which will not be described.

Second Embodiment

Figure 7:
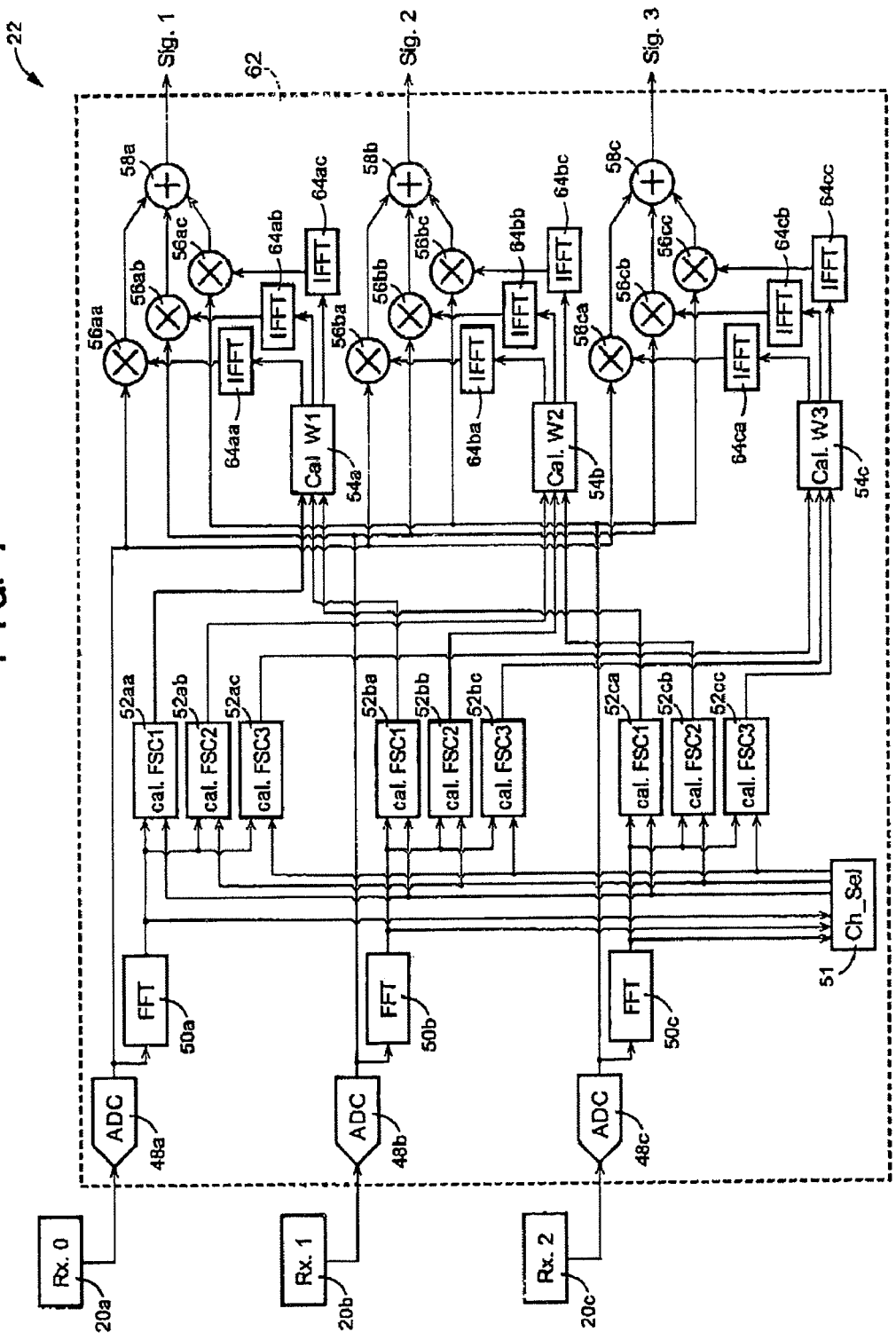
FIG. 7 is a view showing in detail an electrical arrangement of a radio-frequency receiver device in the form of a receiver portion incorporated in the radio-frequency tag communication device of FIG. 3, which receiver device is constructed according to a second embodiment of this invention.

Referring to FIG. 7, there is shown in detail an electrical arrangement of an adaptive processing portion 62 of the receiver portion 22, which is constructed according to a second embodiment of this invention and which is incorporated in the radio-frequency tag communication device 12. In this adaptive processing portion 62, the received signals converted into the digital signals by the first, second and third received-signal A/D converting portions 48a, 48b, 48c are applied to the frequency analyzing portions 50 and the weight multiplying portions 56. The adaptive processing portion 62 further includes intermediate frequency analyzing portions 64 operable to convert signals indicative of the weight vectors for each communication channel calculated by the weight calculating portions 54, into timewise signals. In the adaptive processing portion 62, the signal indicative of the weight vectors corresponding to the first channel, which are calculated by the first weight calculating portion 54a are converted into the timewise signals by the first, second and third intermediate frequency analyzing portions 64aa, 64ab, 64ac, and the timewise signals are respectively applied to the first, second and third weight multiplying portions 56aa, 56ab, 56ac, and are respectively multiplied by the received signals received from the first, second and third received-signal A/D converting portions 48a, 48b, 48c. Similarly, the signal indicative of the weight vectors corresponding to the second channel, which are calculated by the second weight calculating portion 54b are converted into the timewise signals by the fourth, fifth and sixth intermediate frequency analyzing portions 64ba, 64bb, 64bc, and the timewise signals are respectively applied to the fourth, fifth and sixth weight multiplying portions 56ba, 56bb, 56bc, and are respectively multiplied by the received signals received from the first, second and third received-signal A/D converting portions 48a, 48b, 48c, while the signal indicative of the weight vectors corresponding to the third channel, which are calculated by the third weight calculating portion 54c are converted into the timewise signals by the seventh, eighth and ninth intermediate frequency analyzing portions 64ca, 64cb, 64cc, and the timewise signals are respectively applied to the seventh, eighth and ninth weight multiplying portions 56ca, 56cb, 56cc, and are respectively multiplied by the received signals received from the first, second and third received-signal A/D converting portions 48a, 48b, 48c.

In the second embodiment described above, the adaptive processing portion 62 includes: the characteristic extracting portions 52 operable to extract the characteristic signals indicative of the characteristics of the received signals received by the plurality of receiver antennas 20, on the basis of the frequency signals obtained by conversion from the received signals by the frequency analyzing portions 50; the weight calculating portions 54 operable to calculate the weights to be respectively given to the received signals received by the respective receiver antennas 20, on the basis of the characteristic signals extracted by the characteristic extracting portions 52; the intermediate inverse frequency analyzing portions 64 operable to convert the signals indicative of the weights calculated by the weight calculating portions 54, into the timewise signals; the weight multiplying portions 56 operable to multiply the received signals received by the respective receiver antennas 20, by the timewise signals which are obtained by conversion from the weights by the intermediate inverse frequency analyzing portions 64 and which indicate the weights; and the signal combining portions 58 operable to combine together the received signals multiplied by the timewise signals obtained by the weight calculating portions 56. Thus, the characteristic extracting and weight calculating operations of the received signals are effected on the basis of the frequency signals, and the subsequent processing operations are effected on the basis of the timewise signals, so that the timewise signals in the form of discrete or sampled signals can be utilized as the signals for conversion into the frequency signals for the weight calculating operation.

Third Embodiment

Figure 8:
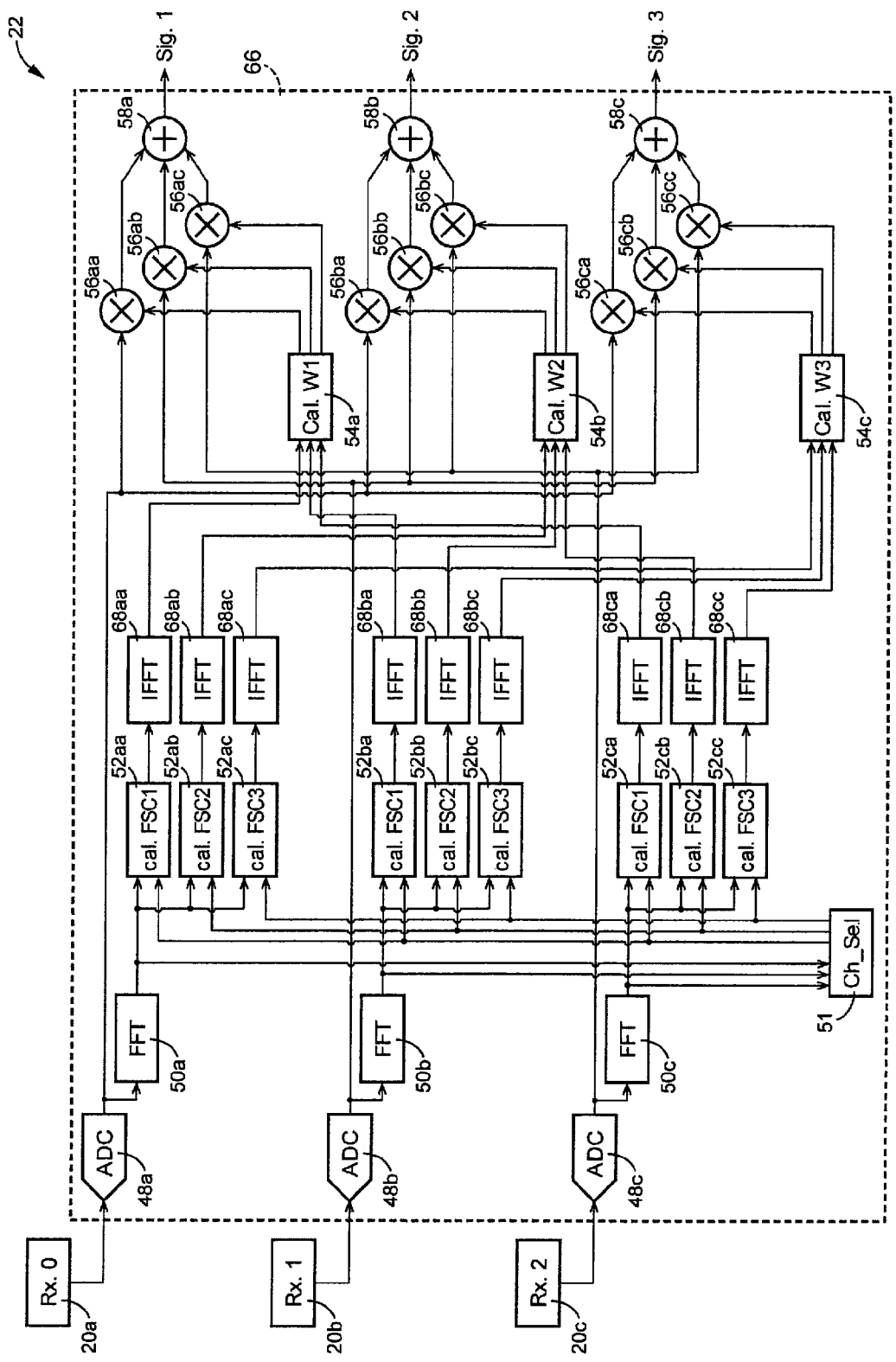
FIG. 8 is a view showing in detail an electrical arrangement of a radio-frequency receiver device in the form of a receiver portion incorporated in the radio-frequency tag communication device of FIG. 3, which receiver device is constructed according to a third embodiment of this invention.

Referring to FIG. 8, there is shown in detail an electrical arrangement of an adaptive processing portion 66 of the receiver portion 22, which is constructed according to a third embodiment of this invention and which is incorporated in the radio-frequency tag communication device 12. In this adaptive processing portion 66, the received signals converted into the digital signals by the first, second and third received-signal A/D converting portions 48a, 48b, 48c are applied to the frequency analyzing portions 50 and the weight multiplying portions 56. The adaptive processing portion 62 includes first through ninth inverse frequency analyzing portions 68aa, 68ab, 68ac, 68ba, 68bb, 68bc, 68ca, 68cb and 68cc. The characteristic signal extracted by the first characteristic extracting portion 52aa is converted into the timewise signal by the first inverse frequency analyzing portion 68aa, and the thus obtained timewise signal is applied to the first weight calculating portion 54a. The characteristic signal extracted by the second characteristic extracting portion 52ab is converted into the timewise signal by the second inverse frequency analyzing portion 68ab, and the thus obtained timewise signal is applied to the second weight calculating portion 54b. The characteristic signal extracted by the third characteristic extracting portion 52ac is converted into the timewise signal by the third inverse frequency analyzing portion 68ac, and the thus obtained timewise signal is applied to the third weight calculating portion 54c. The characteristic signal extracted by the fourth characteristic extracting portion 52ba is converted into the timewise signal by the fourth inverse frequency analyzing portion 68ba, and the thus obtained timewise signal is applied to the second weight calculating portion 54a. The characteristic signal extracted by the fifth characteristic extracting portion 52bb is converted into the timewise signal by the fifth inverse frequency analyzing portion 68bb, and the thus obtained timewise signal is applied to the second weight calculating portion 54b. The characteristic signal extracted by the sixth characteristic extracting portion 52bc is converted into the timewise signal by the sixth inverse frequency analyzing portion 68bc, and the thus obtained timewise signal is applied to the third weight calculating portion 54c. The characteristic signal extracted by the seventh characteristic extracting portion 52ca is converted into the timewise signal by the seventh inverse frequency analyzing portion 68ca, and the thus obtained timewise signal is applied to the first weight calculating portion 54a. The characteristic signal extracted by the eighth characteristic extracting portion 52cb is converted into the timewise signal by the eighth inverse frequency analyzing portion 68cb, and the thus obtained timewise signal is applied to the second weight calculating portion 54b. The characteristic signal extracted by the ninth characteristic extracting portion 52 cc is converted into the timewise signal by the ninth inverse frequency analyzing portion 68 cc, and the thus obtained timewise signal is applied to the third weight calculating portion 54c.

In the third embodiment described above, the adaptive processing portion 66 includes: the characteristic extracting portions 52 operable to extract the characteristic signals indicative of the characteristics of the received signals received by the plurality of receiver antennas 20, on the basis of the frequency signals obtained by conversion from the received signals by the frequency analyzing portions 50; the inverse frequency analyzing portions 68 operable to convert the characteristic signals extracted by the characteristic extracting portions 68, into the timewise signals; the weight calculating portions 54 operable to calculate the weights to be respectively given to the received signals received by the respective receiver antennas 20, on the basis of the timewise signals obtained by conversion from the characteristic signals by said inverse frequency analyzing portions; the weight multiplying portions 56 operable to multiply the received signals received by the respective receiver antennas 20, by the weights calculated by the weight calculating portions 54; and the signal combining portions 58 operable to combine together the received signals multiplied by the weights calculated by the weight calculating portions 56. Thus, the characteristic extracting operation of the received signals is effected on the basis of the frequency signals, and the subsequent processing operations are effected on the basis of the timewise signals, so that the timewise signals in the form of discrete or sampled signals can be utilized as the signals for conversion into the frequency signals for the characteristic extracting operation.

Fourth Embodiment

Figure 9:
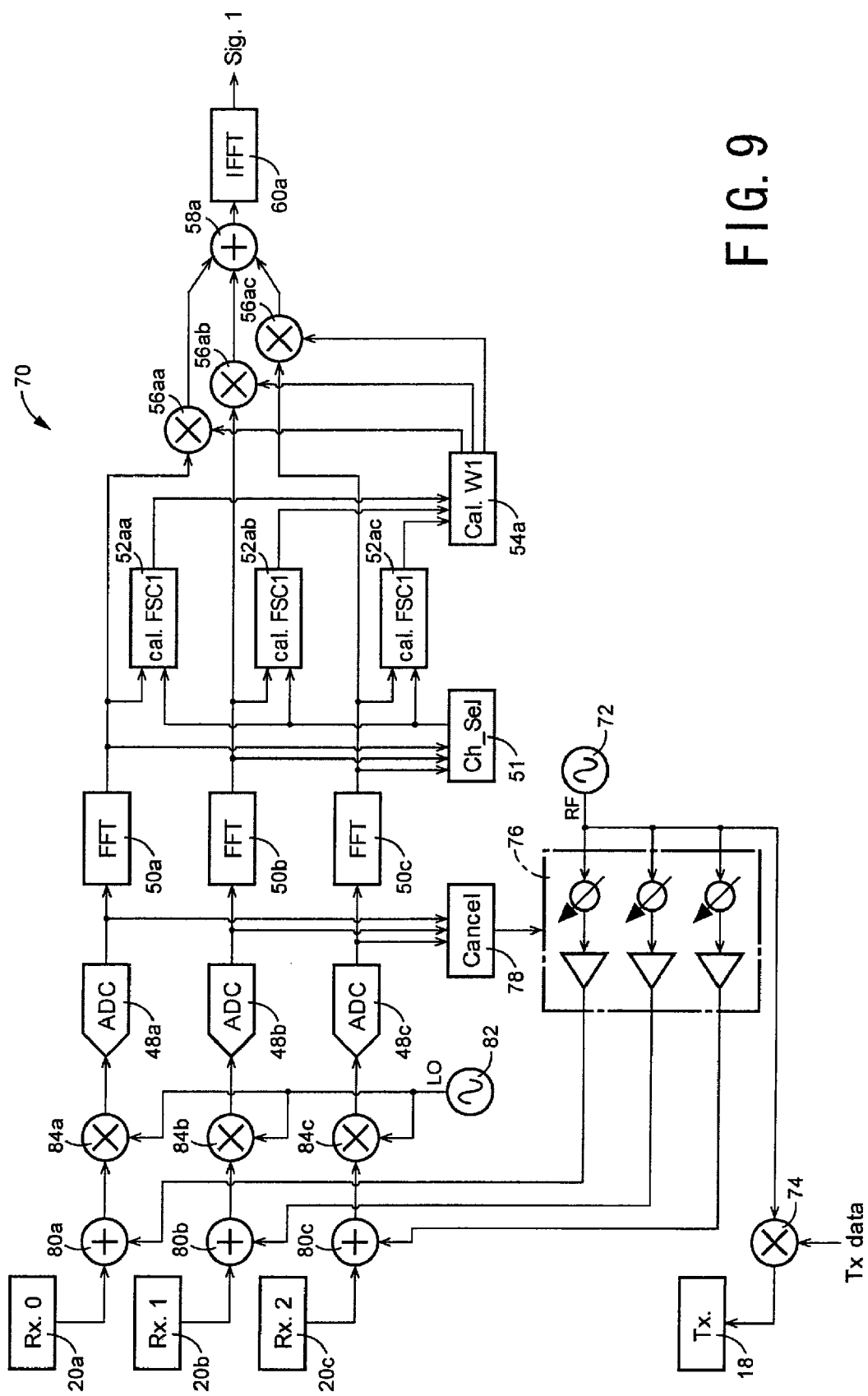
FIG. 9 is a view showing in detail an electrical arrangement of a radio-frequency receiver device in the form of a receiver portion incorporated in the radio-frequency tag communication device of FIG. 3, which receiver device is constructed according to a fourth embodiment of this invention.
Figure 13:
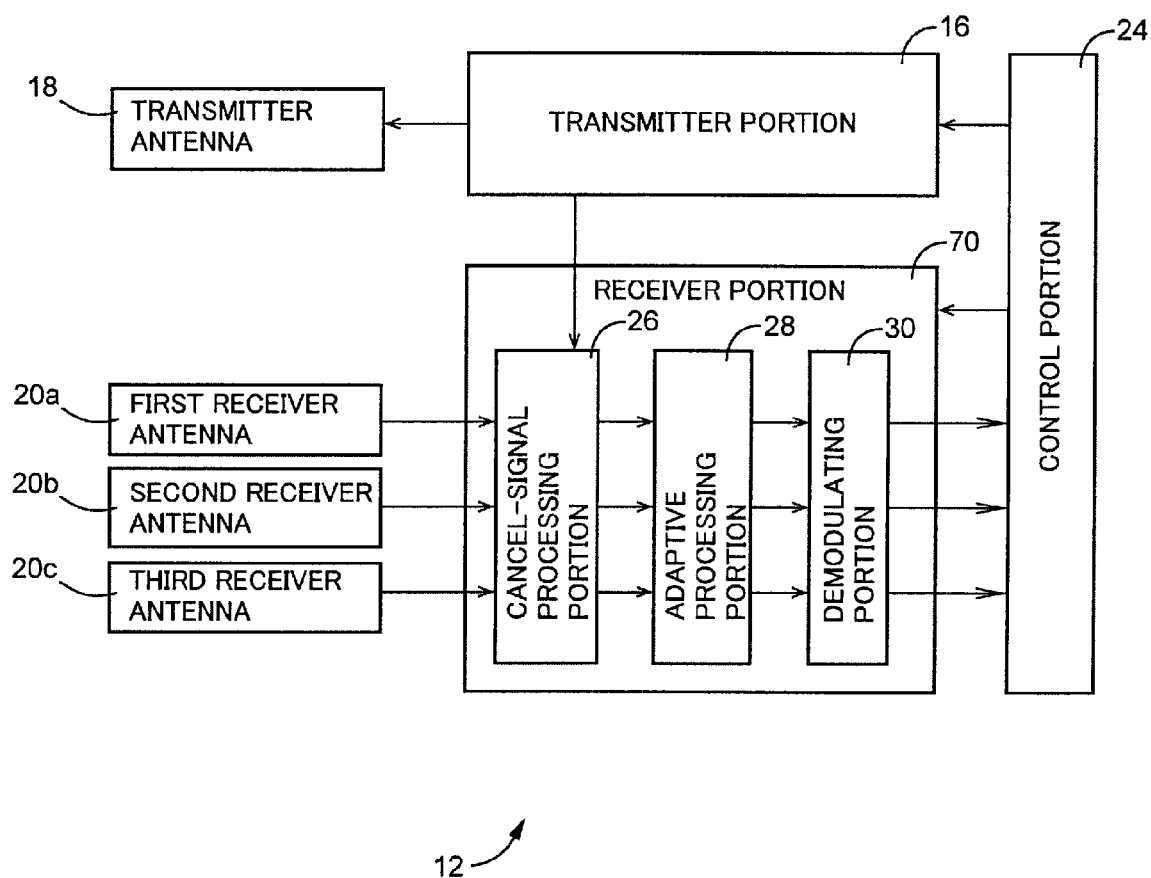
FIG. 13 is a view showing a modification of the electrical arrangement of the radio-frequency tag communication device of FIG. 3.

FIG. 13 is a view showing a modified electrical arrangement of the radio-frequency tag communication device 12, while FIG. 9 is a view showing in detail an electrical arrangement of the transmitter portion 26, and an electrical arrangement of a radio-frequency receiver device in the form of a receiver portion 70 which is incorporated in the radio-frequency tag communication device 12 and which is constructed according to a fourth embodiment of this invention. The receiver portion 70 according to the fourth embodiment includes a cancel-signal processing portion 26, as shown in FIG. 13. The cancel-signal processing portion 26 is arranged to eliminate leakage signals included in the received signals received through the plurality of receiver antennas 20. As shown in FIG. 9, the transmitter portion 26 includes a main-carrier generating portion 72 operable to generate a main carrier wave having a predetermined frequency, and an interrogating-wave generating portion 74 operable to generate an interrogating wave $F_c$ by combining together the main carrier wave generated by the main-carrier generating portion y72 and a desired information signal. The interrogating wave $F_c$ generated by the interrogating-wave generating portion 74 is transmitted through the transmitter antenna 18 toward the radio-frequency identification tags 14. The receiver portion 70 includes: a cancel-signal generating portion 76 operable to generate cancel signals having the same frequency as the main carrier wave transmitted from the main-carrier generating portion 72; a cancel-signal control portion 78 operable to control the phase and amplitude of the cancel signals generated by the cancel-signal generating portion 76; first, second and third cancel-signal adding portions 80a, 80b and 80c each operable to add the cancel signal whose phase and amplitude have been controlled by the cancel-signal control portion 78, to the received signal received by the corresponding one of the first, second and third receiver antennas 20; a local-signal generating portion 82 operable to generate a local signal having a predetermined frequency; and first, second and third down-converters 84a, 84b and 84c each operable to multiply the received signal from which the leakage signal has been eliminated by the corresponding one of the first, second and third cancel-signal adding portions 80a, 80b, 80c, by the local signal generated by the local-signal generating portion 82. The outputs of the first, second and third down-converters 84a, 84b, 84c are converted by the first, second and third received-signal A/D converting portions 48a, 48b and 48c, into digital signals which are subjected to the adaptive processing described above. It is noted that the cancel-signal generating portion 76, cancel-signal control portion 78 and cancel-signal adding portions 80 of the receiver portion 70 cooperate to function as the cancel-signal processing portion 26 indicated above.

Preferably, the cancel-signal control portion 78 is arranged to control the phase and amplitude of the cancel signal to be added to each received signal by the corresponding cancel-signal adding portion 80, such that the signal power of the main carrier wave of the received signal to which the cancel signal have been added is minimized. Generally, the leakage signal which is a part of the interrogating wave Fc transmitted from the transmitter antenna 18 may be mixed with the received signals received by the plurality of receiver antennas 20. The leakage signal can be eliminated by adding to the received signals the cancel signals which have the same frequency as that of the main carrier wave and the phase opposite to that of the main carrier wave. The cancel-signal generating portion 76 can easily generate the cancel signals having the same frequency as the main carrier wave, by controlling the phase and amplitude of the main carrier wave generated by the main-carrier generating portion 72.

In the fourth embodiment described above, the receiver portion 70 includes: the cancel-signal generating portion 76 operable to generate the cancel signals having the same frequency as the main carrier wave of the transmitted signal transmitted from the transmitter portion 16; the cancel-signal control portion 78 operable to control the phase and amplitude of the cancel signals generated by the cancel-signal generating portion 76; and the cancel-signal adding portions 80 operable to add, to the respective received signals received by the plurality of receiver antennas 20, the cancel signals the phase and amplitude of which have been controlled by the cancel-signal control portion 78. The cancel signal control portion 78 is arranged to control the phase and amplitude of the cancel signals, so as to minimize the signal power of the main carrier wave of the received signals to which the cancel signals have been added by the cancel-signal adding portions 80. Accordingly, the leakage signal which is a part of the transmitted signal and which is included in the received signals can be effectively eliminated from the received signals.

Fifth Embodiment

Figure 10:
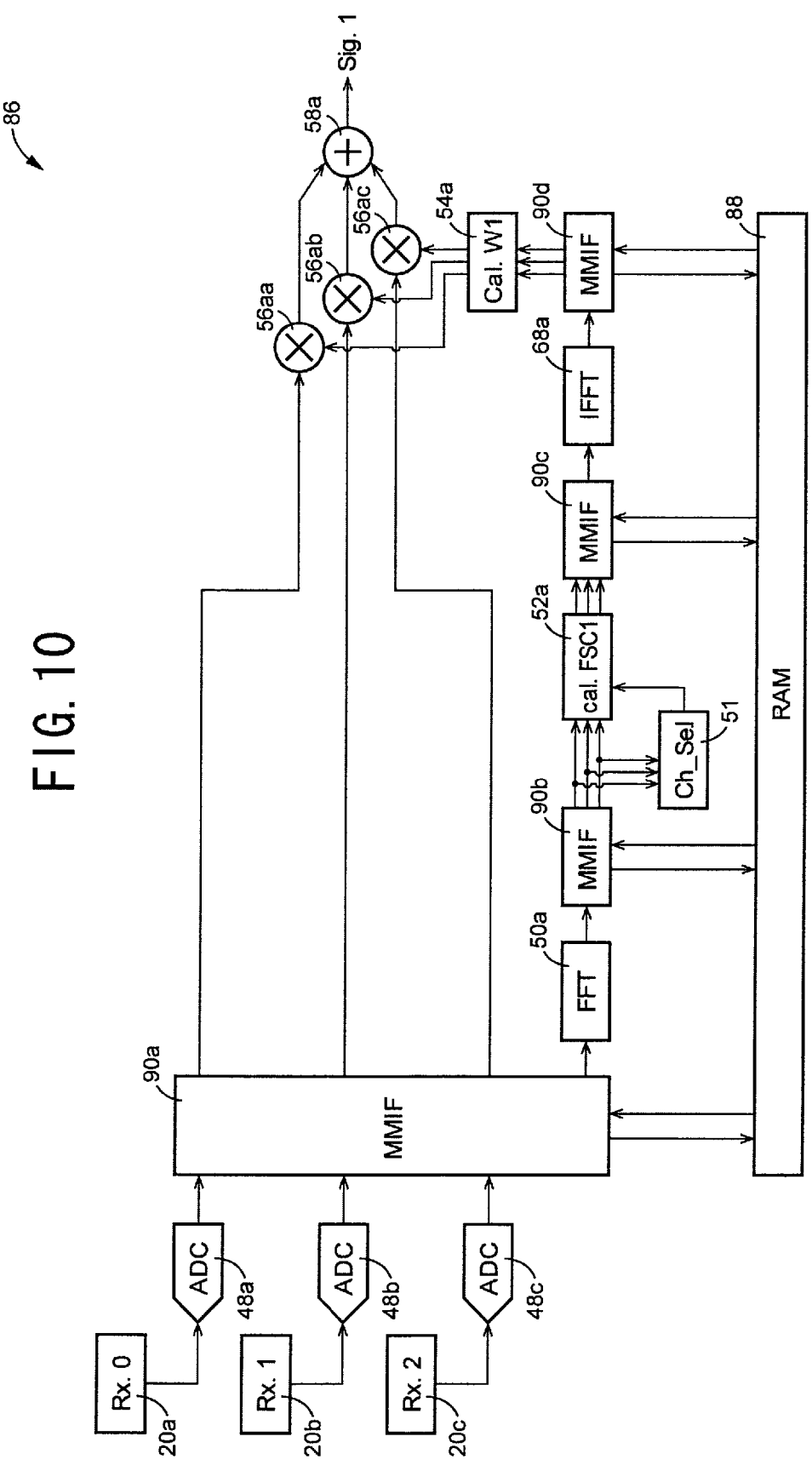
FIG. 10 is a view showing in detail an electrical arrangement of a radio-frequency receiver device in the form of a receiver portion incorporated in the radio-frequency tag communication device of FIG. 3, which receiver device is constructed according to a fifth embodiment of this invention.

Referring next to FIG. 10, there is shown in detail an electrical arrangement of a radio-frequency receiver device in the form of a receiver portion 86 which is incorporated in the radio-frequency tag communication device 12 and which is constructed according to a fifth embodiment of this invention. In FIG. 10, the first, second and third characteristic extracting portions 52aa, 52ab, 52ac are collectively shown as the characteristic extracting portion 52a. The receiver portion 86 includes: a RAM 88 for storing the received signals received by the plurality of receiver antennas 20; a first memory interface 90a operable to store in the RAM 88 the received signals which have been converted into the digital signals by the first, second and third received-signal A/D converting portions 48a, 48b, 48c, and operable to read out the received signals from the RAM 88 and to apply the read-out received signals to the frequency analyzing portions 50 and the weight multiplying portions 56; a second memory interface 90b operable to store in the RAM 88 the received signals which have been converted into the frequency signals by the frequency analyzing portions 50, and operable to read out the received signals from the RAM 88 and to apply the read-out received signals to the communication channel setting portion 51 and the characteristic extracting portions 52; a third memory interface 90c operable to store in the RAM 88 the characteristic signals extracted by the characteristic extracting portions 52, and operable to read out the received signals from the RAM 88 and to apply the read-out received signals to the inverse frequency analyzing portions 68; and a fourth memory interface 90d operable to store in the RAM 88 the characteristic signals which have been converted into the timewise signals by the inverse frequency analyzing portions 68, and operable to read out the characteristic signals from the RAM 88 and to apply the read-out characteristic signals to the weight calculating portions 54. Preferably, each of the weight calculating portions 54 included in the receiver portion 86 is arranged to stop calculation of the weight for a predetermined length of time after the composite signal obtained by the corresponding signal-combining portion 58 has been converged into a predetermined value.

Referring to the flow chart of FIGS. 11 and 12, there will be described a control routine repeated executed with a predetermined cycle time by the receiver portion 86 to process the received signals.

Figure 11:
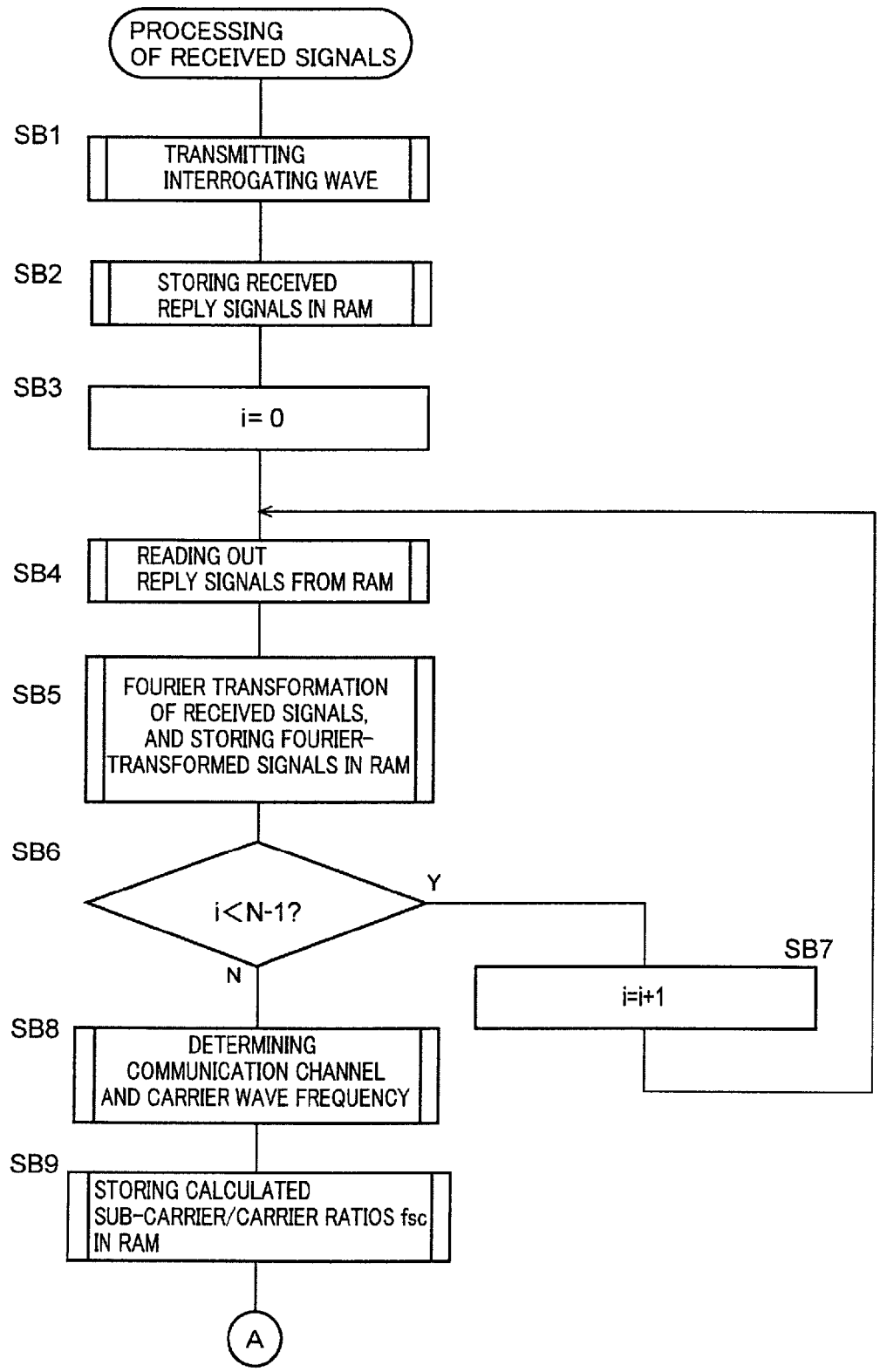
FIG. 11 is a fragmentary flow chart illustrating a part of an operation of the receiver portion to process received signals.
Figure 12:
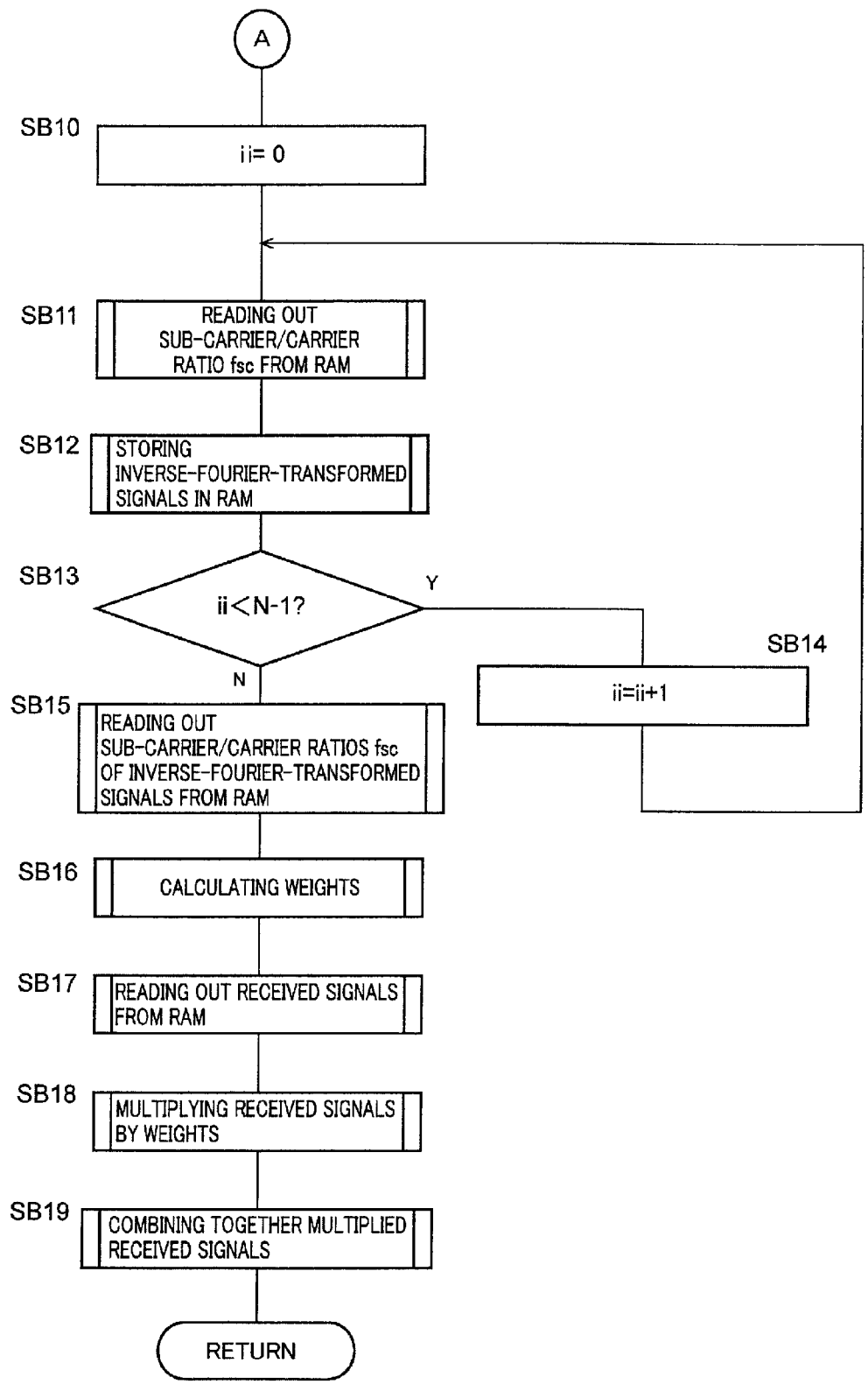
FIG. 12 is a fragmentary flow chart illustrating the other part of the operation of the receiver portion.

The control routine of FIGS. 11 and 12 is initiated with step SB1 corresponding to the transmitter portion 16, in which the interrogating wave $F_c$, is transmitted from the transmitter antenna 18 toward the radio-frequency identification tags 14. Then, the control flow goes to step SB2 corresponding to the first memory interface 90a, in which the reply waves or signals transmitted from the radio-frequency identification tags 14 and received by the plurality of receiver antennas 20 are converted into the digital signals by the received-signal A/D converting portions 48, and the digital signals are stored in the RAM 88. The control flow then goes to step SB3 to reset a count "i" of a signal counter to zero. Then, the control flow goes to step SB4 corresponding to the first memory interface 90a, to read out the received signal from the RAM 88. The control flow then goes to step SB5 corresponding to the frequency analyzing portions 50 and the second memory interface 90b, in which the received signal which has been read out in step SB4 is subjected to fast Fourier transformation (FFT), and the Fourier-transformed received signal is stored in the RAM 88. The control flow then goes to step SB6 to determine whether the count "i" of the signal counter is smaller than (N−1). "N" represents the number of the receiver antennas 20. If an affirmative decision is obtained in step SB6, the control flow goes to step SB7 to increment the count "i" by 1, and steps SB4, SB5 and SB6 are repeated. If a negative decision is obtained in step SB6, the control flow goes to step SB8 corresponding to the second memory interface 90b, in which the received signals which have been converted into the frequency signals are read out from the RAM 88, and the communication channels described above are set, while the frequency of the main carrier wave is detected. Then, the control flow goes to step SB9 corresponding to the characteristic extracting portions 52 and the third memory interface 90c, in which the sub-carrier/carrier ratios $f_{sc}$ are calculated on the basis of the frequency signals which have been read out in step SB8.

Then, the control flow goes to sep SB10 to reset a count "ii" of another signal counter to zero. The control flow then goes to step SB11 corresponding to the third memory interface 90c, in which the sub-carrier/carrier ratio $f_{sc}$, of the received signal is read out from the RAM 88. Then, the control flow goes to step SB12 corresponding to the inverse frequency analyzing portions 68 and the four memory interface 90d, in which the sub-carrier/carrier ratio $f_{sc}$ of the received signal which has been read out from the RAM 88 in step SB11 is subjected to the inverse Fourier transformation (IFFT), and the inverse-Fourier-transformed sub-carrier/carrier ratio $f_{sc}$, is stored in the RAM 88. The control flow ten goes to step SB13 to determine whether the count "ii" is smaller than (N−1). If an affirmative decision is obtained in step SB13, the control flow goes to step SB14 to increment the count "ii" by 1, and steps SB10, SB11 and SB12 are repeated. If a negative decision is obtained in step SB13, the control flow goes to sep SB15 corresponding to the fourth memory interface 90d, in which the inverse-Fourier-transformed sub-carrier/carrier ratios $f_{sc}$, of all received signals are read out from the RAM 88. Then, the control flow goes to step SB16 corresponding to the weight calculating portions 454 to calculate the difference between each received signal and the reference signal, and determine whether the calculated difference is not larger than a predetermined value and a lapse of time after the moment of the last calculation of the weight is within a predetermined time. If a negative decision is obtained, the weight vector is calculated on the basis of the sub-carrier/carrier ratio $f_{sc}$ read out in step SB15. The control flow then goes to step SB17 corresponding to the first memory interface 90a, to read out from the RAM 88 the digital signals obtained by conversion from the received signals received by the respective receiver antennas 20. Then, the control flow goes to step SB18 corresponding to the weight multiplying portions 56 to multiply the received signals (digital signals) read out in step SB17) by the weights calculated in step SB16. Then, the control flow goes to step SB19 corresponding to the signal combining portions 58, to combine together the received signals multiplied in step SB18, and one cycle of execution of the present control routine is terminated.

In the fifth embodiment described above, the receiver portion 86 includes a memory device in the form of the RAM 88 for storing the received signals received by the plurality of receiver antennas 20, and the weight calculating portions 54 operable to read out the received signals from the RAM 88 and calculate the weight vectors. This arrangement permits the calculation of the weights with a simple circuit.

Further, the weight calculating portions 54 included in the receiver portion 86 are arranged to stop calculation of the weight for a predetermined length of time after the composite signal obtained by the corresponding signal-combining portion 58 has been converged into a predetermined value. Accordingly, the receiver portion 86 eliminates n unnecessary weight calculating operation, so that the required electric power consumption can be reduced. In addition, the required volume of arithmetic operation for the weight calculation can be reduced, making it possible to accordingly reduce the time required for processing the received signals.

Further, the present receiver portion 86 including the RAM 88 permits the setting of the plurality of communication channels by the communication channel setting portion 51 by reading out from the RAM 88 the received signals received from the plurality of radio-frequency identification tags 14 through the plurality of receiver antennas 20, so that the weight calculating operation and the subsequent demodulating operation are performed for each of the set communication channels, whereby the communication with the radio-frequency identification tags 14 can be effected with a simple arrangement of the receiver portion 86.

While the preferred embodiments of this invention have been described in detail by reference to the accompanying drawings, it is to be understood that the invention is not limited to the details of the illustrated embodiments, but may be otherwise embodied.

In the illustrated embodiments, the frequency analyzing portions 50, communication channel setting portion 51, characteristic extracting portions 52, weight calculating portions 54, weight multiplying portions 56, signal combining portions 58, inverse frequency analyzing portions 60, etc. are provided as individual elements controlled by the control portion 24. However, the functions of those elements may be performed by the control portion 24, or a DSP (Digital Signal Processor). Similarly, the functions of the cancel-signal generating portion 76, cancel-signal control portion 78, cancel-signal adding portions 80, etc. may be performed by the control portion 24 or a DSP.

In the radio-frequency tag communication device 12 in the illustrated embodiments, the transmitter antenna 18 and the plurality of receiver antennas 20 are provided as individual elements. However, these transmitter and receiver antennas may be replaced by a combination of a transmitter/receiver antenna device and a directional coupler. This combination simplifies the arrangement of the radio-frequency tag communication device 12. It is also noted that the radio-frequency tag communication device 12 may a plurality of transmitter antennas for transmitting the transmitted signal (interrogating signal).

While the illustrated embodiments are arranged for the triple back-scatter communication of the radio-frequency tag communication device 12 with the three radio-frequency identification tags 14a, 14b, 14c, the radio-frequency tag communication device 12 may be arranged to effect communication with four or more radio-frequency identification tags 14. In this case, the radio-frequency tag communication device 12 requires an arrangement for establishing communication channels the number of which is sufficient for the number of the radio-frequency identification tags 14.

Although the illustrated embodiments are arranged for adaptive processing for communication with the radio-frequency identification tags 14 using the sub-carrier wave, the principle of the present invention is not limited to a radio-frequency communication device for back-scatter communication, but is equally applicable to any other type of radio-frequency communication such as OFDM (Orthogonal Frequency Division Multiplexing), which employs the adaptive processing technique.

It is to be understood that the present invention may be embodied various other modifications which mat occur to those skilled in the art, without departing from the spirit and scope of this invention.

What is claimed is:

1. A radio-frequency receiver device comprising:
a plurality of antenna elements; and
an adaptive processing portion for controlling weights to be given to respective received signals respectively received by said plurality of antenna elements, said adaptive processing portion includes:
a plurality of frequency analyzing portions configured to convert the received signals received by said plurality of antenna elements into frequency signals;
a plurality of characteristic extracting portions configured to extract characteristic signals indicative of characteristics of the received signals received by said plurality of antenna elements, on the basis of said frequency signals obtained by conversion from the received signals by said frequency analyzing portions;
a plurality of weight calculating portions configured to calculate said weights to be respectively given to the received signals, solely on the basis of said characteristic signals extracted by said characteristic extracting portions;
a plurality of inverse frequency analyzing portions configured to convert said weight calculated by said weight calculating portions, into timewise signals;
a plurality of weight multiplying portions configured to multiply the received signals respectively received by said plurality of antenna elements, by said timewise signals obtained by conversion from said weights by said inverse frequency analyzing portions; and
a signal combining portion configured to combine together the received signals multiplied by said timewise signals obtained by said weight multiplying portions,
wherein said adaptive processing portion is configured to control said weights on the basis of said frequency signals obtained by conversion from said received signals by said frequency analyzing portions.

2. The radio-frequency receiver device according to claim 1, wherein said frequency analyzing portions are configured to effect Fourier transformation of the received signals received by said plurality of antenna elements, into said frequency signals.

3. The radio-frequency receiver device according to claim 1, wherein said plurality of characteristic extracting portions extract, as said characteristic signals, a main carrier wave and side band signals from said frequency signals obtained by said frequency analyzing portions, and said plurality of weight calculating portions calculate said weights to be respectively given to the received signals received by said plurality of antenna elements, on the basis of a correlation between said carrier and said side band signals which have been extracted by said characteristic extracting portions.

4. The radio-frequency receiver device according to claim 3, wherein said plurality of weight calculating portions calculate said weights to be respectively given to the received signals received by said plurality of antenna elements, such that a ratio of said main carrier wave and said side band signals extracted by said characteristic extracting portions becomes as close as possible to a predetermined value.

5. The radio-frequency receiver device according to claim 3, wherein said plurality of characteristic extracting portions extract a pair of side band signals in the form of an upper band signal and a lower band signal which have a same difference of frequency with respect to a frequency of said main carrier wave.

6. The radio-frequency receiver device according to claim 3, wherein said plurality of characteristic extracting portions extract a plurality of pair of side band signals each pair in the form of an upper band signal and a power band signal which have a same difference of frequency with respect to a frequency of said main carrier wave, and said plurality of weight calculating portions calculate different weight vectors for the respective of pairs of side band signals extracted by said characteristic extracting portions.

7. The radio-frequency receiver device according to claim 3, wherein said adaptive processing portion further includes a memory for storing the received signals received by said plurality of antenna elements, and said plurality of weight calculating portions read out from said memory said received signals to calculate said weights.

8. The radio-frequency receiver device according to claim 1, wherein for a predetermined length of time after a composite signal obtained by said signal combining portion has been converged into a predetermined value.

9. A radio-frequency tag communication device comprising a transmitter portion configured to transmit a predetermined transmitted signal toward a plurality of radio-frequency tags, a plurality of receiver antennas, and a radio-frequency receiver device configured to receive through said plurality of receiver antennas received signals transmitted from said plurality of radio-frequency tags in response to said transmitted signals, said radio-frequency receiver device including an adaptive processing portion as defined in claim 1.

10. A radio-frequency receiver device comprising:
a plurality of antenna elements; and
an adaptive processing portion for controlling weights to be given to respective received signals respectively received by said plurality of antenna elements, said adaptive processing portion includes:
a plurality of frequency analyzing portions configured to convert the received signals received by said plurality of antenna elements into frequency signals;
a plurality of characteristic extracting portions configured to extract characteristic signals indicative of characteristics of the received signals received by said plurality of antenna elements, on the basis of said frequency signals obtained by conversion from the received signals by said frequency analyzing portions;
a plurality of inverse frequency analyzing portions configured to convert said characteristic signals extracted by said characteristic extracting portions, into timewise signals;
a plurality of weight calculating portions configured to calculate said weights to be respectively given to the received signals, solely on the basis of said timewise signals obtained by conversion from said characteristic signals by said inverse frequency analyzing portions;
a plurality of weight multiplying portions configured to multiply the received signals respectively received by said plurality of antenna elements, by said weights calculated by said weight calculating portions; and
a signal combining portion configured to combine together the received signals multiplied by said weights calculated by said weight multiplying portions,
wherein said adaptive processing portion is configured to control said weights on the basis of said frequency signals obtained by conversion from said received signals by said frequency analyzing portions.

11. The radio-frequency receiver device according to claim 10, wherein said plurality of characteristic extracting portions extract, as said characteristic signals, a main carrier wave and side band signals from said frequency signals obtained by said frequency analyzing portions, and said plurality of weight calculating portions calculate said weights to be respectively given to the received signals received by said plurality of antenna elements, on the basis of a correlation between said carrier and said side band signals which have been extracted by said characteristic extracting portions.

12. The radio-frequency receiver device according to claim 11, wherein said plurality of weight calculating portions calculate said weights to be respectively given to the received signals received by said plurality of antenna elements, such that a ratio of said main carrier wave and said side band signals extracted by said characteristic extracting portions becomes as close as possible to a predetermined value.

13. The radio-frequency receiver device according to claim 11, wherein said plurality of characteristic extracting portions extract a pair of side band signals in the form of an upper band signal and a lower band signal which have a same difference of frequency with respect to a frequency of said main carrier wave.

14. The radio-frequency receiver device according to claim 11, wherein said plurality of characteristic extracting portions extract a plurality of pair of side band signals each pair in the form of an upper band signal and a power band signal which have a same difference of frequency with respect to a frequency of said main carrier wave, and said plurality of weight calculating portions calculate different weight vectors for the respective of pairs of side band signals extracted by said characteristic extracting portions.

15. The radio-frequency receiver device according to claim 11, wherein said adaptive processing portion further includes a memory for storing the received signals received by said plurality of antenna elements, and said plurality of weight calculating portions read out from said memory said received signals to calculate said weights.

16. The radio-frequency receiver device according to claim 10, wherein for a predetermined length of time after a composite signal obtained by said signal combining portion has been converged into a predetermined value.

17. A radio-frequency receiver device comprising:
a plurality of antenna elements; and
an adaptive processing portion for controlling weights to be given to respective received signals respectively received by said plurality of antenna elements, said adaptive processing portion includes:
a plurality of frequency analyzing portions configured to convert the received signals received by said plurality of antenna elements into frequency signals;
a cancel-signal generating portion configured to generate cancel signals having a same frequency as that of a main carrier wave of a transmitted signal transmitted from a transmitter portion of a communication device which includes said radio-frequency receiver device;
a cancel-signal control portion configured to control a phase and an amplitude of said cancel signals generated by said cancel-signal generating portion; and
a plurality of cancel-signal adding portion configured to add, to the respective received signals received by said plurality of antenna elements, said cancel signals the phase and amplitude of which have been controlled by said cancel-signal control portion,
wherein said adaptive processing portion is configured to control said weights solely on the basis of said frequency signals obtained by conversion from said received signals by said frequency analyzing portions, and
wherein said cancel signal control portion is configured to control said phase and amplitude of the received signals, so as to minimize a signal power of said main carrier wave of the received signals to which said cancel signals have been added by said cancel-signal adding portions.

* * * * *